United States Patent
Sugawara

(10) Patent No.: US 12,280,714 B2
(45) Date of Patent: Apr. 22, 2025

(54) INPUT DEVICE

(71) Applicant: ALPS ALPINE CO., LTD., Tokyo (JP)

(72) Inventor: Takehito Sugawara, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 115 days.

(21) Appl. No.: 18/306,480

(22) Filed: Apr. 25, 2023

(65) Prior Publication Data

US 2023/0256902 A1    Aug. 17, 2023

Related U.S. Application Data

(63) Continuation of application No. PCT/JP2021/032780, filed on Sep. 7, 2021.

(30) Foreign Application Priority Data

Nov. 9, 2020 (JP) .................. 2020-186765

(51) Int. Cl.
*B60Q 3/70* (2017.01)
*B60K 35/10* (2024.01)
(Continued)

(52) U.S. Cl.
CPC ............... *B60Q 3/70* (2017.02); *B60K 35/10* (2024.01); *B60Q 3/20* (2017.02); *B60R 16/03* (2013.01);
(Continued)

(58) Field of Classification Search
CPC ... B60Q 3/70; B60Q 3/20; B60Q 9/00; B60K 35/10; B60K 35/29; B60K 2360/143;
(Continued)

(56) References Cited

U.S. PATENT DOCUMENTS

| 10,061,557 | B1* | 8/2018 | Prakah-Asante | ...... B60N 2/002 |
| 10,665,155 | B1* | 5/2020 | Rao | ........................ B60K 35/28 |

(Continued)

FOREIGN PATENT DOCUMENTS

| JP | 2000-318445 | 11/2000 |
| JP | 2002-070417 | 3/2002 |

(Continued)

OTHER PUBLICATIONS

International Search Report for PCT/JP2021/032780 mailed on Oct. 12, 2021.

*Primary Examiner* — Curtis J King
(74) *Attorney, Agent, or Firm* — IPUSA, PLLC

(57) ABSTRACT

An input device has: an operating part having lighting parts and accepting input operations in: a first input mode, in which a first device including a window or a door lock of a vehicle can be operated; or a second input mode, in which a second device can be operated; an emergency detection part detecting an emergency of the vehicle; and a control part setting an input mode of the operating part between the first input mode and the second input mode, and setting the lighting of the lighting parts to: a first lighting state, in which the lighting parts are lit with emphasis; or a second lighting state, in which the lighting parts are not lit with emphasis, and, upon detection of an emergency, the control part sets the operating part to the first input mode and sets at least one lighting part to the first lighting state.

14 Claims, 16 Drawing Sheets

(51) Int. Cl.
    *B60Q 3/20*     (2017.01)
    *B60R 16/03*    (2006.01)
    *B60K 35/29*    (2024.01)

(52) U.S. Cl.
    CPC ........ *B60K 35/29* (2024.01); *B60K 2360/143* (2024.01); *B60K 2360/191* (2024.01); *B60K 2360/345* (2024.01); *B60K 2360/349* (2024.01)

(58) Field of Classification Search
    CPC ........ B60K 2360/191; B60K 2360/345; B60K 2360/349; B60K 35/00; B60R 16/03; B60R 16/02; B60R 21/00
    See application file for complete search history.

(56) References Cited

U.S. PATENT DOCUMENTS

| | | | | |
|---|---|---|---|---|
| 12,103,388 | B2* | 10/2024 | Yamanouchi | B60K 35/00 |
| 2002/0024309 | A1 | 2/2002 | Takagi | |
| 2002/0070697 | A1* | 6/2002 | Maldonado | B60R 21/01 |
| | | | | 318/445 |
| 2005/0280524 | A1* | 12/2005 | Boone | G09F 27/00 |
| | | | | 340/461 |
| 2006/0155429 | A1* | 7/2006 | Boone | G09F 21/049 |
| | | | | 701/1 |
| 2009/0187314 | A1* | 7/2009 | Kitamura | B60R 16/0231 |
| | | | | 701/45 |
| 2010/0318266 | A1 | 12/2010 | Schaaf et al. | |
| 2012/0206483 | A1* | 8/2012 | Funabashi | G08G 1/096783 |
| | | | | 345/629 |
| 2014/0075362 | A1* | 3/2014 | Gray | G07C 5/0808 |
| | | | | 715/772 |
| 2015/0274016 | A1 | 10/2015 | Kinoshita et al. | |
| 2015/0363348 | A1* | 12/2015 | Deratany | B60K 37/00 |
| | | | | 710/304 |
| 2017/0197617 | A1* | 7/2017 | Penilla | G08G 1/0129 |
| 2017/0320685 | A1* | 11/2017 | Hoofard | E06B 3/44 |
| 2017/0349099 | A1* | 12/2017 | Kunze | G02B 27/0101 |
| 2018/0285664 | A1* | 10/2018 | Satyakumar | G06N 3/08 |
| 2018/0285665 | A1* | 10/2018 | Paszkowicz | B60W 40/08 |
| 2018/0370466 | A1* | 12/2018 | Murata | H02J 9/06 |
| 2019/0080637 | A1* | 3/2019 | Kanaguchi | B60Q 1/2619 |
| 2020/0026370 | A1* | 1/2020 | Shin | H03K 17/965 |
| 2020/0051529 | A1* | 2/2020 | Higashiyama | G02B 27/0093 |
| 2020/0130622 | A1* | 4/2020 | Lerner | G01C 21/3697 |
| 2020/0152197 | A1* | 5/2020 | Penilla | H04L 67/125 |
| 2020/0262294 | A1* | 8/2020 | Gautier | B60K 35/00 |
| 2021/0261076 | A1* | 8/2021 | Pomish | B60R 21/01 |
| 2022/0185215 | A1* | 6/2022 | Shang | B60R 21/013 |
| 2022/0314915 | A1* | 10/2022 | Balaji Sg | B60J 7/0573 |
| 2022/0363269 | A1* | 11/2022 | Saito | B60R 21/00 |
| 2022/0388464 | A1* | 12/2022 | Roberts | B60R 22/322 |
| 2023/0202298 | A1* | 6/2023 | Hintermaier | B60K 35/00 |
| | | | | 701/36 |
| 2023/0256827 | A1* | 8/2023 | Liu | B60K 35/10 |
| | | | | 701/45 |

FOREIGN PATENT DOCUMENTS

| | | |
|---|---|---|
| JP | 2009-161146 | 7/2009 |
| JP | 2010-285148 | 12/2010 |
| JP | 2013-222299 | 10/2013 |
| JP | 2015-193280 | 11/2015 |

* cited by examiner

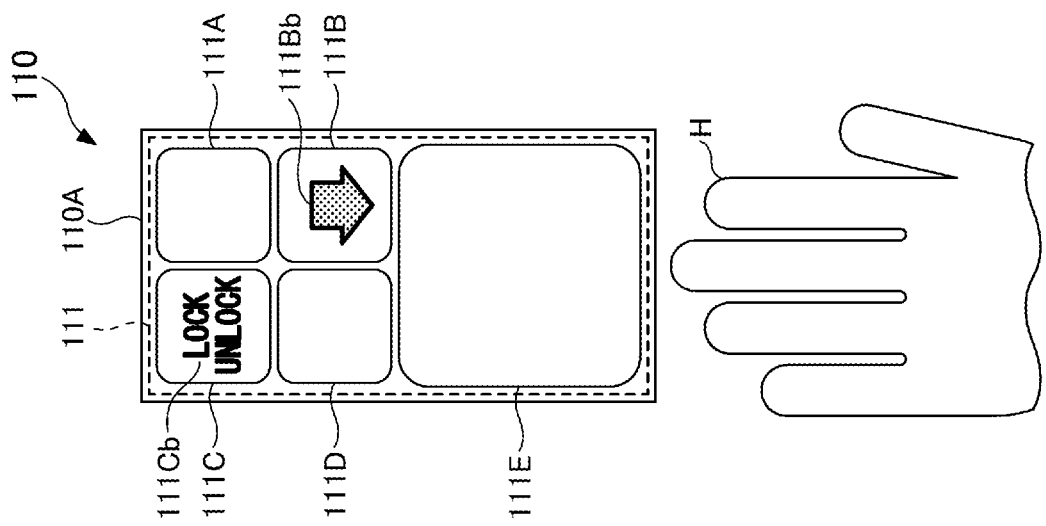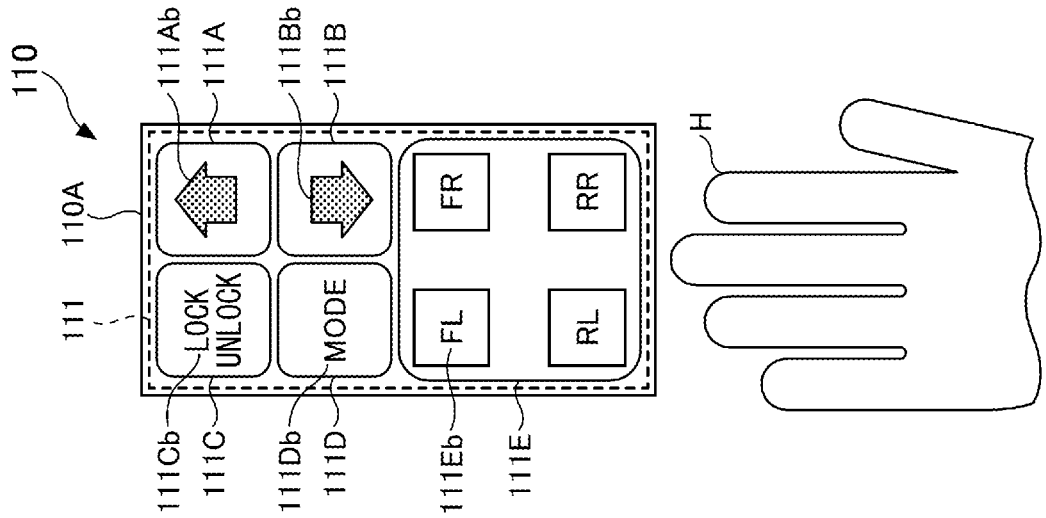

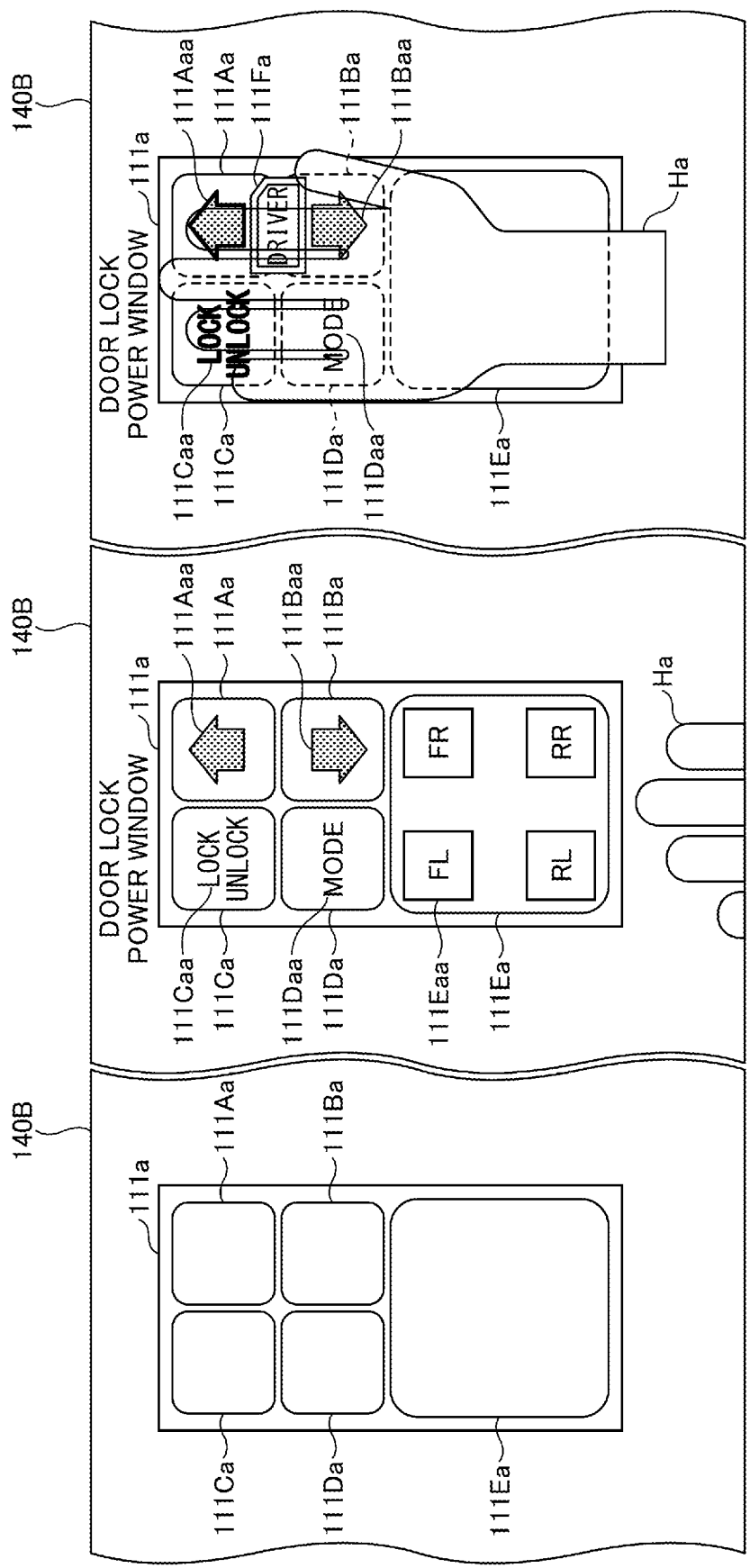

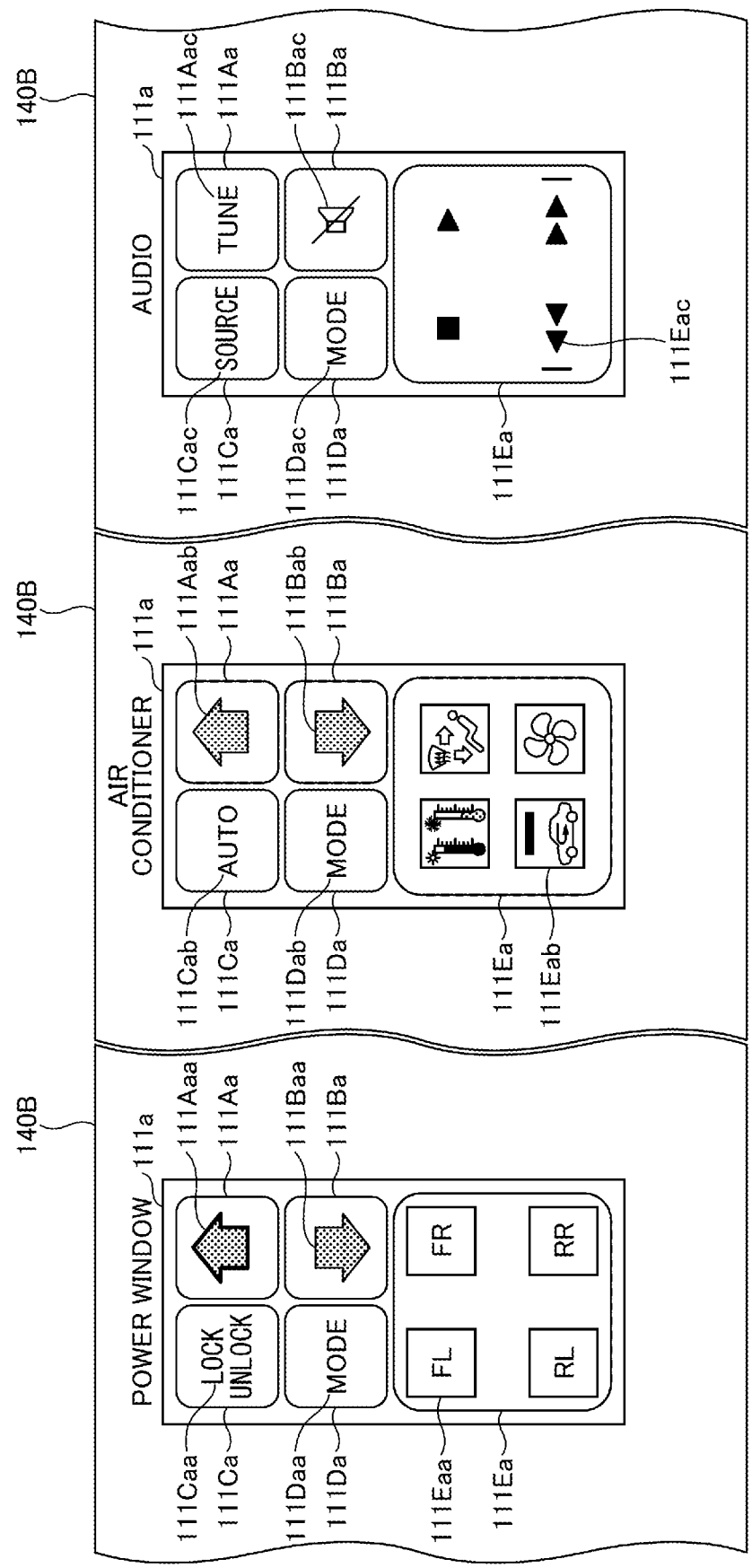

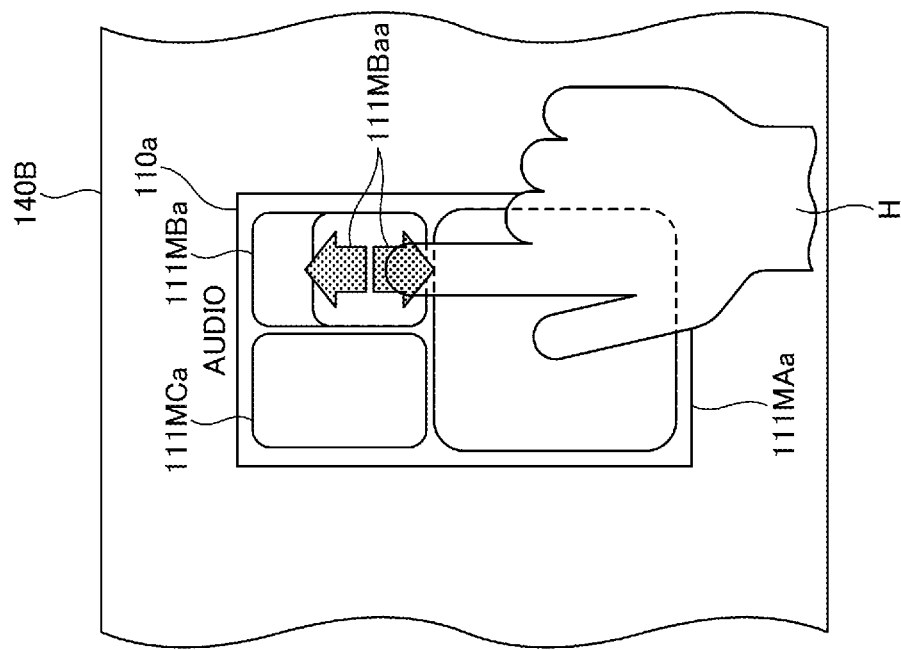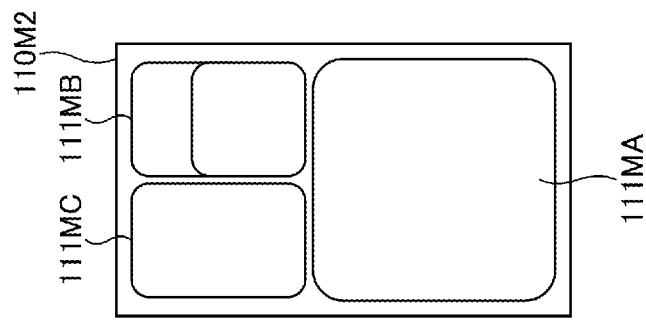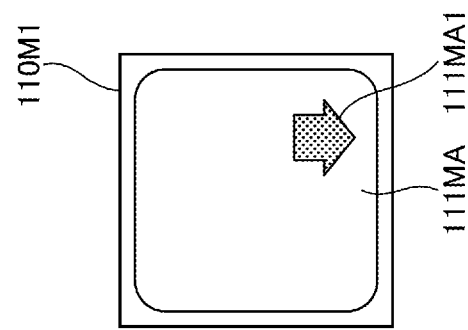

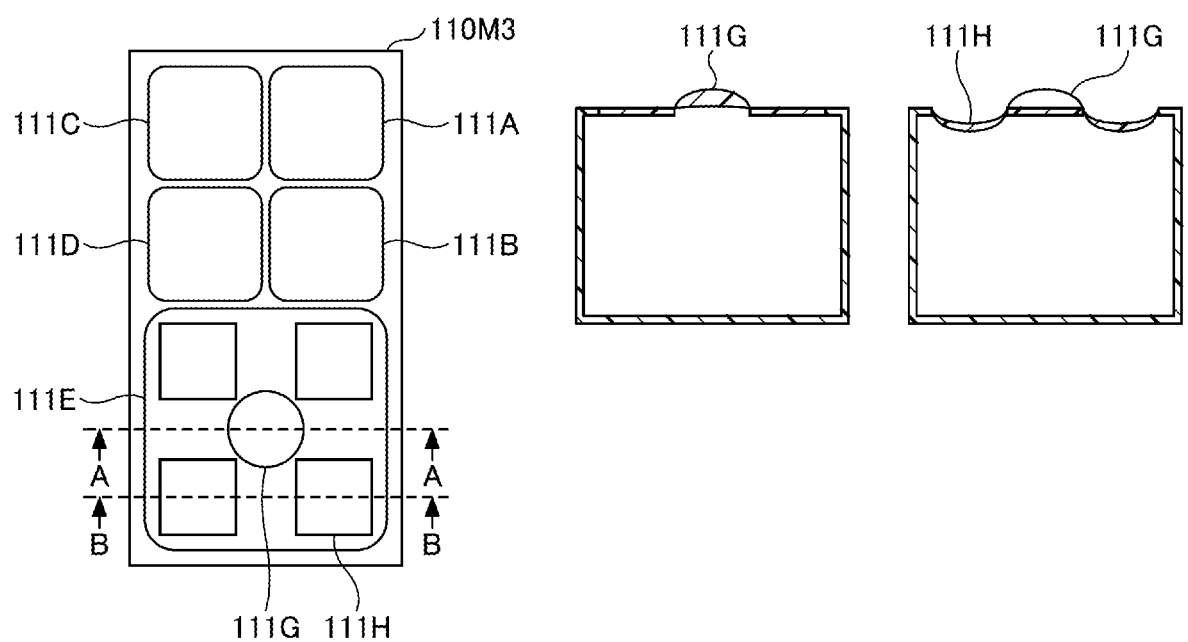

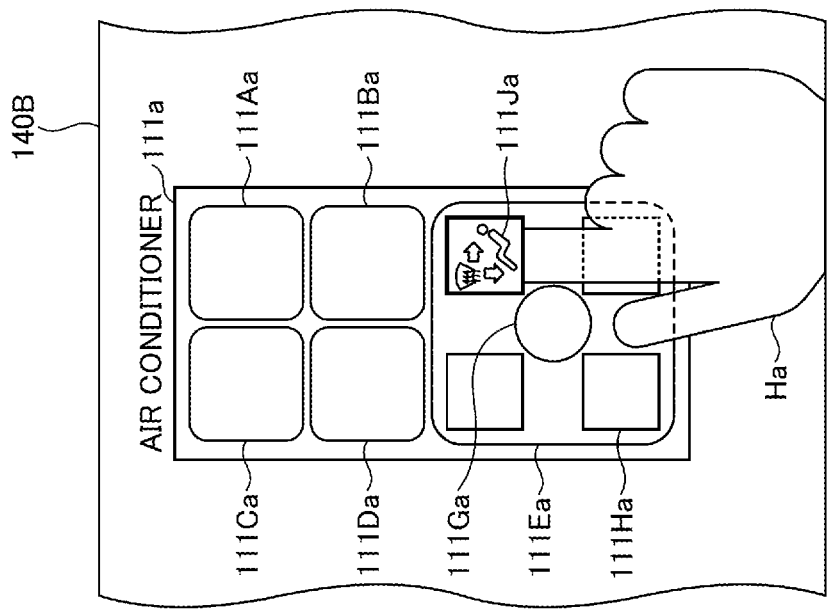
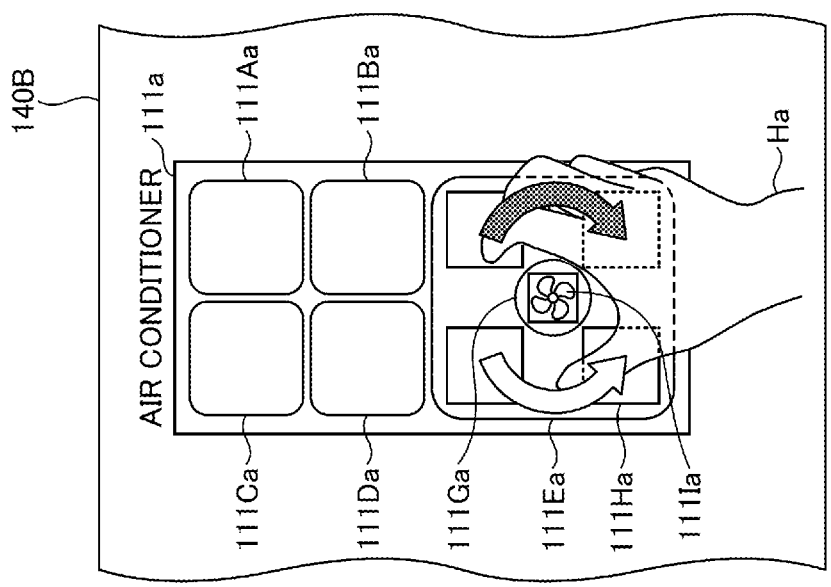

INPUT DEVICE

CROSS-REFERENCE TO RELATED APPLICATION

The present application is a continuation filed under U.S.C. 111(a) claiming the benefit under 35 U.S.C. 120 and 365(c) of PCT International Application No. PCT/JP2021/032780, filed on Sep. 7, 2021, and designating the U.S., which is based on and claims priority to Japanese Patent Application No. 2020-186765, filed on Nov. 9, 2020. The entire contents of PCT International Application No. PCT/JP2021/032780 and Japanese Patent Application No. 2020-186765 are incorporated herein by reference.

BACKGROUND OF THE INVENTION

1. Field of the Invention

The present invention relates to an input device.

2. Description of the Related Art

There has heretofore been a vehicle submersion warning device including: a vehicle; a submersion detection mechanism that detects the submersion of the vehicle when the vehicle submerges in water; and an alerting device that issues a warning when the submersion detection mechanism detects the submersion of the vehicle in water (see, for example, Patent Document 1).

CITATION LIST

Patent Document

[Patent Document 1] Unexamined Japanese Patent Application Publication No. 2000-318445

SUMMARY OF THE INVENTION

Technical Problem

Now, although existing vehicle submersion warning devices produce a warning against the submersion of a vehicle in water, these devices do not indicate which positions in the operating part should be operated to control the vehicle's windows and door locks when the vehicle submerges in water. Also, existing vehicle submersion warning devices do not indicate which positions in the operating part should be operated to control the vehicle's windows and door locks, not only when the vehicle submerges in water, but also when an emergency occurs such as when the vehicle has a collision. Once an emergency such as a vehicle's submersion or collision occurs, the passengers of the vehicle may have difficulty thinking calmly, and it may be difficult for them to make appropriate judgment and appropriate operations quickly. It then follows that, when the vehicle's windows or door locks need to be operated in order to secure an exit from the vehicle in the event of an emergency, and if the positions (operating positions) of parts to be operated such as switches are difficult to find, it may lead to misjudgment and the wrong operations, and there is a possibility that it will take time for the vehicle's passengers to make appropriate judgment and perform appropriate operations. When an emergency such as described above occurs, it is important to find and operate the vehicle's windows or door locks as soon as possible.

It is therefore an object of the present invention to provide an input device that can indicate the positions in the operating part for operating vehicle's windows or door locks when the vehicle is in an emergency.

Solution to Problem

An input device according to an embodiment of the present invention has: an operating part having lighting parts and configured to accept input operations in one of: a first input mode, in which an operation for operating, among devices provided in vehicle, at least a first device including a window or a door lock of the vehicle can be made; and a second input mode, in which an operation for operating a second device other than the first device among the devices provided in the vehicle can be made; an emergency detection part configured to detect an emergency of the vehicle; and a control part configured to set an input mode of the operating part to one of the first mode and the second input mode, and set a lighting state of the lighting parts to one of: a first lighting state, in which lighting of the lighting parts is emphasized; and a second lighting state, in which the lighting of the lighting parts is not emphasized, and, in this input device, in response to the emergency detection part detecting the emergency of the vehicle, the control part sets the operating part to the first input mode, and sets at least one of the lighting parts to the first lighting state.

Advantageous Effects of the Invention

The present invention can provide an input device that can indicate the operating positions of vehicle's windows or door locks when the vehicle is in an emergency.

BRIEF DESCRIPTION OF THE DRAWINGS

FIGS. 3A and 3B show an operating part 110 at normal times and at times of emergencies;

FIGS. 5A, 5B, and 5C show display on the HUD 140B;

FIGS. 7A, 7B, and 7C show display on the HUD 140B in a first input mode and a second input mode;

FIGS. 11A, 11B, and 11C show an operating part according to a modification of the embodiment;

FIGS. 13A, 13B, and 13C show an operating part 110M3 according to a modification of the embodiment;

FIGS. 14A and 14B show examples of images on the HUD 140B;

DETAILED DESCRIPTION OF THE PREFERRED EMBODIMENTS

Now, an embodiment to which the input device of the present invention is applied will be described below.

Embodiment

Figure 1:
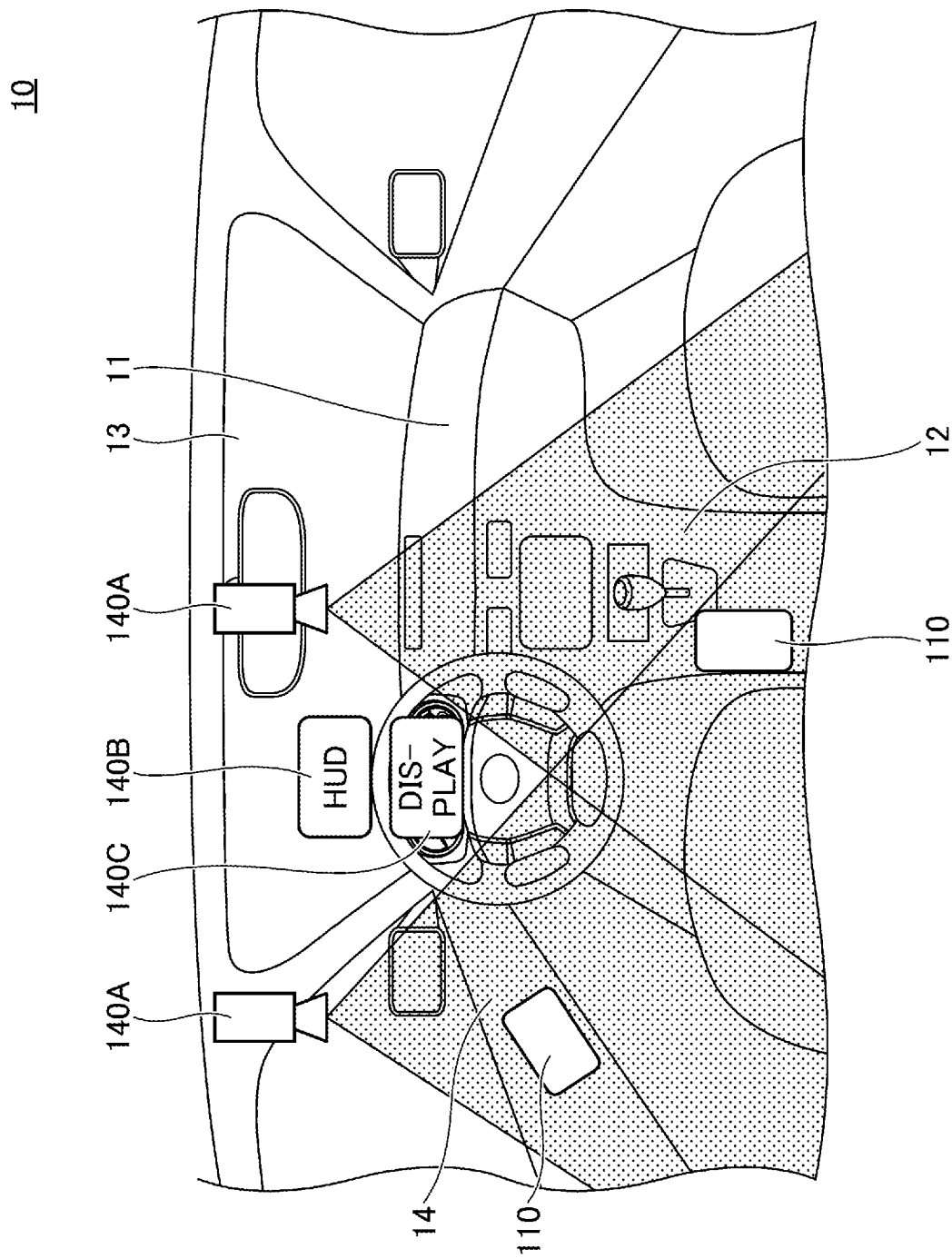
FIG. 1 shows the interior of a vehicle 10 equipped with an input device according to an embodiment.

FIG. 1 shows the interior of a vehicle 10 equipped with the input device according to an embodiment. FIG. 1 shows a dashboard 11, a center console 12, a windshield (front window) 13, a door panel 14, and so forth. An operating part 110 is provided in the center console 12 and in the door panel 14. Two cameras 140A are arranged on the ceiling of the interior of the vehicle 10. Also, a HUD (Head Up Display) 140B is provided in the windshield 13, and a display 140C is provided in the dashboard 11. The display 140C is, for example, a display device using a LCD (Liquid Crystal Display), an OLED (Organic Light Emitting Diode), or the like. The HUD 140B and the display 140C can display data related to the driving condition of the vehicle 10, as well as data related to various in-vehicle equipment such as power window switches, door lock switches, navigation system, air conditioner, and audio system.

The two cameras 140A can photograph moving images and still images around the two operating parts 110 from above. The operating part 110 can operate the power windows and/or the door locks, and can also operate the in-vehicle equipment other than the power windows and door locks, such as the air conditioner (air-conditioning device), the audio system, and so forth. Note that the windows that can be operated as power windows include, for example, the four side windows, namely the FR (front right), FL (front left), RR (rear right), and RL (rear left) windows, of the vehicle 10.

Figure 2:
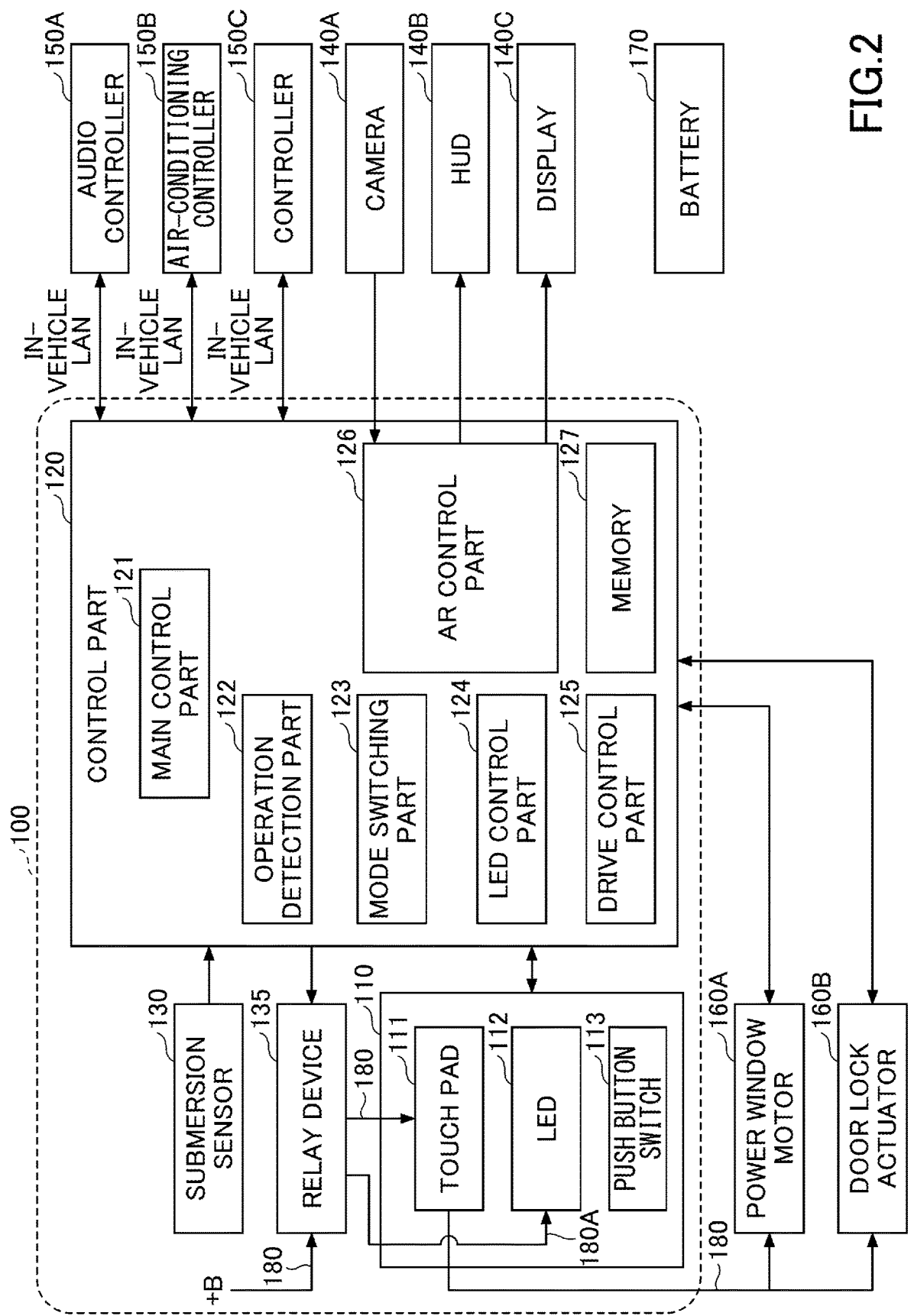
FIG. 2 shows in-vehicle equipment including an input device 100 according to the embodiment.

FIG. 2 shows in-vehicle equipment including the input device 100 according to the embodiment. In the following description, it is assumed that a user operates the input device 100. The user refers to the user of the vehicle 10, typically a passenger. Among the in-vehicle equipment of the vehicle 10, FIG. 2 only shows part of the in-vehicle equipment pertaining to the input device 100.

The input device 100 includes an operating part 110, a control part 120, a submersion sensor 130, and a relay device 135. The operating part 110 has a touch pad 111, an LED (Light Emitting Diode) 112, and a push button switch 113. The operating part 110 is an input device that allows the user of the vehicle 10 to perform input operations for operating the in-vehicle equipment, and receives the user's input operations. The control part 120 controls the in-vehicle equipment according to input operations made to the operating part 110.

Some of the in-vehicle equipment pertaining to the input device 100 include a camera 140A, a HUD 140B, a display 140C, an audio controller 150A, an air-conditioning controller 150B, and a controller 150C. Also, some of the in-vehicle equipment pertaining to the input device 100 further include a power window motor 160A, a door lock actuator 160B, and a battery 170. Note that, although one operating part 110 and one camera 140A are shown here, there are actually two of each. Also, although a structure in which two sets of operating parts 110 and cameras 140A, each set including one operating part 110 and one camera 140A, will be described with this embodiment, it is equally possible to employ a structure in which one camera 140A photographs two or more operating parts 110 by using a wide-angle lens or the like. Also, a structure with three sets of operating parts 110 and cameras 140A, each set including one operating part 110 and one camera 140A, may be employed here as well.

The audio controller 150A and the air-conditioning controller 150B are control devices for controlling the audio system and the air conditioner of the vehicle 10. The audio controller 150A and the control part 120 are connected via an in-vehicle LAN (Local Area Network). The air-conditioning controller 150B and the control part 120 are connected via an in-vehicle LAN. The controller 150C is a control device for controlling various in-vehicle equipment other than the audio system and the air conditioner. The controller 150C and the control part 120 are connected via an in-vehicle LAN. The power window motor 160A is a motor that opens and closes the side windows, and the door lock actuator 160B is a drive part that locks and unlocks the door lock mechanisms. When a user enters a window-operating input to the operating part 110, the controller 150C and the power window motor 160A operate together to move the window. When the user operates the operating part 110 so as to lock the doors, the controller 150C and the door lock actuator 160B operate together to move the door lock. The battery 170 is a power source that supplies electric power to the in-vehicle equipment mounted in the vehicle 10.

Next, the operating part 110, the control part 120, the submersion sensor 130, and the relay device 135 included in the input device 100 will be described.

The operating part 110 has a plurality of touch switches or a touch pad. With this embodiment, for example, a structure in which the operating part 110 is provided with a touch pad 111 that capacitively couples with an object that approaches the touch pad 111 with a large capacitance, and thereupon generates a detection signal, will be described. Also, the operating part 110 has a lighting part. The lighting part is provided as part of a panel member having a lighting function. Note that the following description will assume that the panel member is a two-color-molded element using a translucent resin and a non-transparent resin. Here, the panel member and the lighting part will be described only briefly, and the detailed structure will be later described with reference to FIGS. 3A and 3B.

The lighting part is provided on the surface of the panel member, and the light that is output from the LED 112 transmits through the lighting part as light having the shape of a symbol such as a specific mark or letters, or as light having a shape other than the shape of a symbol. As light transmits through the lighting part in this manner, the lighting part lights up in the shape of a symbol or in a shape other than the shape of a symbol. A "symbol" here refers to, for example, letters, numbers, a diagram, a mark, and so forth that have a predetermined meaning. Herein, a symbol refers to letters, numbers, a diagram, a mark, and so forth that are associated with a function of a target device/equipment that the user operates through the operating part 110 (for example, the power windows, the air conditioner, the audio system, etc.). A shape other than the shape of a symbol may refer to, for example, a shape that does not have a particular meaning unlike a symbol. Such non-symbolic shapes include, for example, frame-like shapes such as circular and square shapes where the light of the LED 112 transmits through as is, round annular shapes and rectangular annular shapes that surround symbols, and so forth. The shape of the lighting part has only to be such a symbolic shape or a non-symbolic shape, and the light that transmits through the lighting part becomes light to represent the shape of a symbol or a shape other than the shape of a symbol. In this way, the panel member having the lighting part is lit in the shape of a symbol or in a shape other than the shape of a symbol.

The touch pad 111 has a sensor electrode that generates a detection signal that can identify the area where an operation is performed, or that can identify a position in that area. The touch pad 111 described with this embodiment has capacitively-coupled sensor electrodes. When the user brings his/her finger close to the touch pad 111 or when the user touches the touch pad 111 with a finger, the touch pad 111 generates a detection signal and transmits the detection signal to the control part 120. Note that, with this embodiment, the touch pad 111 will be described as having capacitively-coupled sensor electrodes, as long as the touch pad 111 has sensor electrodes that produce detection signals whereby the position where an operation is performed can be identified, the detection method is not limited to the capacitive coupling method. For example, the sensor electrodes may be resistive sensor electrodes. Also, for example, the touch pad 111 may be structured such that a plurality of load sensors are arranged in the outer peripheral part, so that the position where an operation is performed can be determined based on detection signals from the load sensors.

The touch pad 111 is an input part of the operating part 110, and is connected with the power window motor 160A and the door lock actuator 160B via the control part 120, as shown in FIG. 2. Also, the touch pad 111 is connected with the audio controller 150A, the air-conditioning controller 150B, and the controller 150C, via the control part 120 and the in-vehicle LAN. The touch pad 111 is switched between a plurality of input modes, which will be described later in detail, by the control part 120.

The input modes of the operating part 110 has only to include at least a first input mode and a second input mode. Although input modes other than the first input mode and the second input mode may be included, here, the first input mode and second input mode will be described. The in-vehicle equipment that can be operated differs between the first input mode and the second input mode.

The first input mode is an input mode in which input for operating at least the power window motor 160A and the door lock actuator 160B is enabled, and is an input mode in which input operations to the touch pad 111 enable operation of the power windows and/or door locks. In-vehicle equipment that includes at least the power window motor 160A and the door lock actuator 160B that can be operated in the first input mode is an example of a first device. Note that, below, an example of operating the power window motor 160A and the door lock actuator 160B in the first input mode will be described.

The second input mode is an input mode in which input for operating the audio controller 150A, the air-conditioning controller 150B, or the controller 150C is enabled, and is an input mode in which the audio system, the air conditioner (air-conditioning device), or other in-vehicle equipment can be operated. The second input mode may include a plurality of input modes, depending on the in-vehicle equipment. The audio system, the air conditioner (air-conditioning device), or other in-vehicle equipment that can be operated in the second input mode is an example of a second device, which is different from the first device.

The input mode of the operating part 110 is switched between the first input mode and the second input mode based on an input operation that the user makes to the operating part 110. Since the input mode of the operating part 110 is switched by the control part 120, the operating part 110 can operate various in-vehicle equipment in multiple input modes.

Also, when the vehicle 10 detects an emergency such as the submersion of the vehicle 10 in water, the input mode of the operating part 110 is forcibly set to the first input mode. The setting of the first input mode is to enable operation of the power windows and/or door locks, and allow the user to escape from the vehicle by operating these parts. Details of this will be described later with reference to FIG. 8 and FIG. 9. Also, the "emergency" of the vehicle 10 herein is a state in which the user of the vehicle 10 needs to be rescued. Here, control of the input device 100 when the vehicle 10 submerges in water, which is an example of an emergency, will be described. Also, hereinafter, "normal times" refers to times when the vehicle 10 is in no emergency. Note that the input device 100 can also cope with emergencies other than the submersion of the vehicle 10 in water, and the details thereof will be described later using FIG. 15 and FIG. 16.

Also, when the vehicle 10 submerges in water and the input mode of the operating part 110 is forcibly switched to the first input mode, the lighting part of the operating part 110 is lit with emphasis. This is to make the parts of the operating part 110 that function as power window switches and door lock switches in the first input mode stand out. By doing this, even in a situation in which it is difficult for the user of the vehicle 10 to think calmly, it is still possible to increase the user's likelihood to quickly and appropriately perform the operations for securing an exit.

The LED 112 is an example of a light source that outputs light for lighting the lighting part of the operating part 110. Here, a plurality of LEDs 112 are provided on the back side of a plurality of lighting parts included in the operating part 110. The shape of the lighting parts illuminated by the LEDs 112 is not limited to the shapes of symbols such as letters and symbols, and may have shapes other than the shapes of symbols. For example, the objects to be illuminated by the LEDs 112 may include indicator lamps, the edge parts of areas 111A to 111E provided in the touch pad 111, which will be described later in detail, and frame-shaped light guides provided along the edge parts. These will be later described in detail with reference to FIGS. 3A and 3B.

Also, when the vehicle 10 submerges in water, the input device 100 lights, with emphasis, the lighting parts provided in parts that function as the power window switches and door lock switches in the first input mode, among the lighting parts provided in the operating part 110. This emphasis of lighting parts is achieved by turning on only the LEDs 112 that correspond to the lighting parts provided in parts that function as power window switches and door lock switches in the first input mode, among the LEDs 112 of the input device 100. Details of this will be later described using FIGS. 4A and 4B.

The push button switch 113 is provided between the touch pad 111 and the base part of the operating part 110. The base part of the operating part 110 is a base part for fixing the operating part 110 to the door panel 14, the center console 12, and the like. When an operation of pressing the surface of the touch pad 111 is performed, the touch pad 111 detects the operation, and, when the output of the touch pad 111 transitions to a state indicating that the operation has been detected, the push button switch 113 changes from a non-conducting state to a conducting state. When the press on the touch pad 111 is released and the touch pad 111 resumes its original state, the push button switch 113 returns to its original position before the touch pad 111 was pressed, and resumes the non-conducting state. The push button switch 113 is provided to allow the user to perform the operation for confirming the details of operation performed on the touch pad 111, for example. Note that the push button switch 113 only needs to have a function to detect the transition of the output of the touch pad 111 when a pressing force is applied. For example, a contact such as a tact switch or a rubber dome switch that generates an operational feel when pressed may be used. Also, the push button switch 113 may be a detection mechanism that includes an infrared sensor or the like that can detect changes in the distance over which the output of the touch pad 111 transitions when a pressing force is applied, and that can switch between the non-conducting state and the conducting state of the contact based on the changes. Note that the input device 100 may be structured without the push button switch 113. In that case, for example, the input device 100 may be configured to detect the confirmation operation based on an increase in the area of the fingertip or the like that is in contact with the touch pad 111 when the touch pad 111 is pressed.

When an input operation is made to the operating part 110, the operating part 110 generates a detection signal, and the detection signal is sent to the control part 120. The control part 120 that receives the detection signal generates a control signal, and the control signal is sent to the device provided on the vehicle 10. As a result of this, the vehicle equipment, being the operating target of the input device 100, operates according to the input operation made to the operating part 110.

Also, a relay device 135 is connected to the control part 120. When the vehicle 10 submerges in water and the control part 120 becomes inoperable, power is supplied from the battery 170, through the relay device 135, only to specific LEDs 112, and these specific LEDs 112 are turned on. Among the lighting parts provided in the operating part 110, these specific LEDs 112 are LEDs 112 that correspond to the lighting parts provided in parts that function as power window switches and door lock switches in the first input mode. This is to illuminate the parts that function as power window switches and door lock switches with emphasis when the vehicle 10 submerges in water.

Also, when the vehicle 10 submerges in water and the control part 120 becomes inoperable, the power window motor 160A and/or the door lock actuator 160B can be directly operated by performing input operations on the operating part 110, without involving the control part 120. Details of this will be described later.

The control part 120 has a main control part 121, an operation detection part 122, a mode switching part 123, an LED control part 124, a drive control part 125, an AR (Augmented Reality) control part 126, and a memory 127. The control part 120 is implemented by a computer including a CPU (Central Processing Unit), a RAM (Random Access Memory), a ROM (Read Only Memory), an HDD (Hard Disk Drive), an input/output interface, an internal bus, and so forth.

The main control part 121, the operation detection part 122, the mode switching part 123, the LED control part 124, the drive control part 125, and the AR control part 126 represent the functions of programs executed on the control part 120 as functional blocks. Also, the memory 127 represents, functionally, the memory of the control part 120.

The main control part 121 is a processing part that supervises the control processes of the control part 120, and executes processes other than those executed by the operation detection part 122, the mode switching part 123, the LED control part 124, the drive control part 125, and the AR control part 126.

The operation detection part 122 detects the approach of an object to the touch pad 111 based on output of the touch pad 111, and also detects the details of operation based on the coordinates of input operations made to the touch pad 111. Data to represent the approaching object and the details of operation detected by the operation detection part 122 is transmitted to the mode switching part 123, the LED control part 124, the drive control part 125, or the AR control part 126.

When data to represent an input mode switching operation is transmitted from the operation detection part 122, the mode switching part 123 switches the input mode of the operating part 110 to one among the first input mode and the multiple input modes included in the second input modes. Also, the mode switching part 123 forcibly switches the input mode of the operating part 110 to the first input mode when the submersion sensor 130 detects the submersion of the vehicle 10 in water.

The LED control part 124 controls the lighting of the LEDs 112 according to the first input mode or the second input mode. Here, for example, the LED control part 124 illuminates all the lighting parts of the control part 110 with a luminance for normal times when the submersion of the vehicle 10 is not detected by the submersion sensor 130 in the first input mode, and when the second input mode is set. The time the submersion sensor 130 does not detect the submersion of the vehicle 10 in water in the first input mode and the time the second input mode is set are normal times when the vehicle 10 is not in an emergency.

Also, when the submersion sensor 130 detects the submersion of the vehicle 10 in water, among all the lighting parts provided in the operating part 110, the LED control part 124 turns on only the lighting parts that illuminate the parts that function as power window switches and door lock switches in the first input mode. Also, among all the lighting parts provided in the operating part 110, the LED control part 124 turns off the lighting parts other than the lighting parts that illuminate the parts that function as power window switches and door lock switches in the first input mode. As a result of this, when the vehicle 10 submerges in water, only parts of the operating part 110 that function as power window switches and door lock switches in the first input mode are illuminated, so that parts that function as power window switches and door lock switches in the first input mode are emphasized. Note that "to emphasize" herein means to display certain parts in a more noticeable way than other parts.

Also, the LED control part 124 may turn on the LEDs 112 in a color that is different from that of normal times when the submersion of the vehicle 10 in water is detected. To be more specific, LEDs 112 of a different emission color may be provided and turned on when the submersion of the vehicle 10 in water is detected.

Also, the LED control part 124 may make the LEDs 112 flash intermittently when the submersion of the vehicle is detected. Also, the LED control part 124 may turn on the LEDs 112 with a higher luminance than in normal times. Also, at this time, the LED control part 124 may turn off the LEDs 112 of the operating part 110 other than those that function as power window switches and door lock switches in the first input mode. All of these controls are made so as to display parts that function as power window switches and door lock switches in the first input mode with emphasis.

When data to represent a power window opening/closing operation or a door-lock locking/unlocking operation is transmitted from the operation detection part 122, the drive control part 125 drives the power window motor 160A or the door lock actuator 160B. As a result of this, the side windows of the vehicle 10 are opened or closed, or the doors are locked or unlocked, depending on the amount of operation performed on the touch pad 111.

The AR control part 126 controls the representational images displayed on the HUD 140B or the display 140C. When data to represent operation content is transmitted from the operation detection part 122, the AR control part 126 superimposes representational images of symbols such as letters, signs, or marks that stand for the types of switches provided on the touch pad 111 in the input mode of that time over the representational images of the operating part 110 and its surrounding components, and displays these on the HUD 140B or display 140C. Also, based on the relationship between the position of the operating part 110 and the position of the user's hand included in the image captured by the camera 140A, the AR control part 126 superimposes and displays a representational image of the hand, over the representational image of the operating part 110 and its surrounding components, on the HUD 140B or the display 140C. The content displayed on the HUD 140B or the display 140C under the control of the AR control part 126 will be described later.

The memory 127 stores the programs and data that the operation detection part 122, the mode switching part 123, the LED control part 124, the drive control part 125, and the AR control part 126 need when executing respective control processes, data that is generated by the control processes, and so forth. Also, the memory 127 can store the content of the display settings of the HUD 140B or the display 140C set by the user, the content of functions provided on the touch pad 111 as set by the user, and so forth.

The submersion sensor 130 is a sensor that detects when the vehicle 10 submerges in water to a predetermined depth, and data to represent the detection result is transmitted to the control part 120. The submersion sensor 130 is an example of an emergency detection part that can detect an emergency of the vehicle 10. The submersion sensor 130 has two electrode pads that are spaced apart. When the vehicle 10 submerges in water and the two electrode pads are connected through water, the submersion detection circuit connected to the two electrode pads detects the submersion of the vehicle 10 in water.

The submersion sensor 130 is provided at a lower position than the control part 120 in the vehicle 10, or at a position where, when the vehicle 10 submerges in water, the submersion sensor 130 submerges in water first before the control part 120 does. When the submersion sensor 130 detects the submersion of the vehicle 10 in water, the control part 120 performs control in accordance with the state of the submersion vehicle 10 in water. This control will be described later. However, when the degree of submersion increases, the control part 120 becomes inoperable. For example, after the submersion sensor 130 detects the submersion of the vehicle 10, the water becomes deeper, and the control part 120 itself submerges in water, the control part 120 becomes inoperable.

The relay device 135 is an example of a switching circuit, and is inserted in series in a power supply line 180, which directly connects between the battery 170, the power window motor 160A, and the door lock actuator 160B, via the touch pad 111. The power supply line is realized with a power cable. The relay device 135 is provided between the battery 170 and the touch pad 111. The symbol "+B" shown near the power supply line 180 upstream of the relay device 135 indicates the power supply from the positive terminal of the battery 170.

The relay device 135 detects the potential of a predetermined part of the control part 120. When the control part 120 is operable, the potential of the predetermined part is higher than a threshold, so that the relay device 135 is in a non-conducting state. When the relay device 135 is in a non-conducting state, the power supply line 180 between the battery 170 and the touch pad 111 is in a non-conducting state. In this state, the in-vehicle equipment can be operated via the control part 120 by entering operations through the touch pad 111, and, even if the touch pad 111 is operated, power is not supplied to the power window motor 160A or to the door lock actuator 160B through the power supply line 180.

When the control part 120 becomes inoperable and the potential of a predetermined part of the control part 120 becomes lower than or equal to a threshold, the relay device 135 switches to the conducting state, and the battery 170 and the touch pad 111 are connected. When control part 120 is inoperable, the control part 120 cannot drive the power window motor 160A or the door lock actuator 160B. However, since the relay device 135 switches to the conducting state, if the touch pad 111 is operated, power is supplied to the power window motor 160A and the door lock actuator 160B through the power supply line 180.

Also, the relay device 135 is connected to the LEDs 112 via the power supply line 180A, so that, when the relay device 135 switches to the conducting state, power is supplied from the battery 170 to the LEDs 112.

Therefore, even if the vehicle 10 submerges in water and the control part 120 becomes inoperable, it is still possible to turn on the LEDs 112 and illuminate the parts of the operating part 110 that function as power window switches and door lock switches in the first input mode, without involving the control part 120. Additionally, the touch pad 111 can be used to directly operate the power window motor 160A and/or the door lock actuator 160B.

When the vehicle 10 submerges in water and the control part 120 becomes inoperable, the LEDs 112 are turned on, so that the user of the vehicle 10 can visually identify the parts of the operating part 110 that function as power window switches and door lock switches in the first input mode. Therefore, even if the vehicle 10 submerges in water and the control part 120 becomes inoperable, the user can visually identify the parts of the operating part 110 that function as power window switches and door lock switches in the first input mode, and the user can open the side windows and unlock the doors by operating these parts.

FIGS. 3A and 3B show the operating part 110 at normal times and at times of emergencies. FIG. 3A shows the operating part 110 during normal operation. The operating part 110 has a housing 110A and a touch pad 111. The housing 110A is made of resin, for example, and is produced by two-color molding. The touch pad 111 is housed inside the housing 110A. On the surface of the operating part 110, the areas 111A to 111E assigned to the touch pad 111 in plan view are provided. The areas 111A to 111E are areas in which the touch pad 111 can independently detect input operations. Also, although not shown in FIGS. 3A and 3B, the LEDs 112 and the push button switch 113 are provided on the back of the areas 111A to 111E inside the housing 110A.

Furthermore, a bumpy shape is formed in the housing 110A by a molding technique and provided in edge parts of the areas 111A to 111E. As a result of this, the housing 110A is structured such that, in each of the areas 111A to 111E, the boundaries with other, adjacent areas can be identified visually or tactilely.

Inside the areas 111A and 111B, a lighting part 111Ab having a symbol shape of an upward arrow for closing the side windows, and a lighting part 111Bb having a symbol shape of a downward arrow for opening the side windows, are provided. In the area 111C, a lighting part 111Cb having a symbol shape of letters for switching between locking ("Lock") and unlocking ("Unlock") the doors is provided. In the area 111D, a lighting part 111Db having a symbol shape of letters ("Mode") for switching the input mode of the operating part 110 is provided. The lighting parts 111Bb and 111Cb are examples of parts of the touch pad that are illuminated in the first lighting state. Also, the lighting parts 111Bb and 111Cb are examples of lighting parts that are arranged at positions overlapping the parts of the touch pad for operating the side windows or the door locks of the vehicle in plan view.

Also, in the area 111E, four lighting parts 111Eb having symbol shapes of the letters "FR" (front right), "FL" (front left), "RR" (rear right), and "RL" (rear left), standing for the four side windows, are provided. The lighting parts 111Ab to 111Eb are all molded integrally with the housing 110A by two-color molding. For example, the parts of the lighting parts 111Ab to 111Eb are made of transparent resin, and parts other than the lighting parts 111Ab to 111Eb are made of opaque resin that does not allow light to transmit through.

One LED 112 is provided on the back of each of the lighting parts 111Ab to 111Eb. Therefore, when the LEDs 112 are turned on, light that passes through each of the lighting parts 111Ab to 111Eb becomes light that shows the shape of each corresponding symbol. As a result of this, the lighting parts 111Ab to 111Eb are lit in accordance with the shape of each corresponding symbol. At this time, the lighting parts 111Ab to 111Eb all have equal luminance, and none of the lighting parts 111Ab to 111Eb is emphasized. This lighting state is an example of a second lighting state in which the lighting of the lighting parts is not emphasized.

When the operating part 110 is in the first input mode, the side windows can be moved up and down, the doors can be locked ("Lock") and unlocked ("UnLock"), the input mode ("Mode") can be switched, and the FR (front right), FL (front left), RR (rear right), or RL (rear left) side window can be selected by touching the lighting parts 111Ab to 111Eb provided in the areas 111A to 111E. Note that, in the operating part 110, only the contours of the areas 111A to 111E can be seen when the LEDs 112 are not turned on, and the shapes of the symbols in the lighting parts 111Ab to 111Eb cannot be seen. Also, when entering input in the first input mode, the HUD 140 displays representational images, in which symbols such as letters, signs, or marks stand for the types of switches assigned to the touch pad 111 in the first input mode. The user can also make operations by using the representational image of the operating part 110 displayed on the HUD 140.

Also, when the operating part 110 is in the second input mode, the areas 111A to 111E are assigned functions that are different from those represented by the symbols of the lighting parts 111Ab to 111Eb. To be more specific, the second input mode is an input mode in which operations of the audio controller 150A, the air-conditioning controller 150B, or the controller 150C can be entered. The audio controller 150A, the air-conditioning controller 150B, and the controller 150C can be operated by touching the areas 111A to 111E. When entering input in the second input mode, operations are made by using the representational images displayed on the HUD 140 and representing the operating part 110.

Note that the lighting parts 111Ab to 111Eb may be configured such that not only the part of the symbols, but also the part of contours surrounding the symbols (the contour of the areas 111A to 111D and the four contours surrounding the symbols "FR," "FL," "RR," and "RL") can transmit light, and, in each of the lighting parts 111Ab to 111Eb, the symbol and the contour may be illuminated by separate LEDs 112. In this case, when the operating part 110 is in the second input mode, the LEDs 112 corresponding to the symbols may not be turned on, and only the LEDs 112 corresponding to the contours of the symbols may be turned on. In this way, in the second input mode, the arrows for moving the side windows up and down, the symbol for locking ("Lock") and unlocking ("Unlock") the doors, the symbol for switching the input mode ("Mode"), and the symbols "FR," "FL," "RR," and "RL" are not displayed. Note that the lighting parts provided in the counter parts surrounding these symbols are examples of lighting parts that are lit in shapes other than the shapes of symbols.

FIG. 3B shows the lighting state of the operating part 110 when the submersion sensor 130 detects the submersion of the vehicle 10 in water. When the vehicle 10 submerges in water, the input mode of the operating part 110 is forcibly switched to the first input mode by the mode switching part 123. Then, as shown in FIG. 3B, the LED control part 124 turns on the lighting part 111Bb representing an arrow-shaped symbol for lowering the side windows, and a lighting part 111Cb representing symbols for locking ("Lock") and unlocking ("Unlock") the doors, and turns off the other lighting parts 111Ab, 111Db, and 111Eb. This is an example of a first lighting state in which the lighting of lighting parts is emphasized. In the first lighting state, the lighting parts 111Bb and 111Cb are turned on, and the other lighting parts 111Ab, 111Db, and 111Eb are turned off, thereby emphasizing the lighting of the lighting parts 111Bb and 111Cb. This allows the user to quickly unlock the vehicle and open the side windows by displaying only the parts that need to be operated to secure an exit from the vehicle 10 when the vehicle 20 submerges in water. Note that, instead of turning on the lighting parts 111Bb and 111Cb and turning off the other lighting parts 111Ab, 111Db, and 111Eb, it is also possible to turn on the lighting parts 111Bb and 111Cb with the same luminance, and turn on the other lighting parts 111Ab, 111Db, a 111Eb with lower luminance, thereby emphasizing the lighting parts 111Bb and 111Cb. The lighting parts 111Bb and 111Cb to be displayed with emphasis have only to be lit with a relatively high luminance compared to the other lighting parts 111Ab, 111Db, and 111Eb.

In this way, the first lighting state, in which the lighting part 111Bb and the lighting part 111Cb are turned on and the other lighting parts 111Ab, 111Db, and 111Eb are not turned on, can be achieved by introducing a state in which the LED control part 124 turns on only the LEDs 112 corresponding to the lighting part 111Bb and the lighting part 111Cb and turns off the LEDs 112 corresponding to the lighting parts 111Ab, 111Db, and 111Eb. The lighting part 111Bb and the lighting part 111Cb are lighting parts provided in parts that function as power window switches and door lock switches in the first input mode.

Also, when the submersion sensor 130 detects the submersion of the vehicle 10 in water, the operating part 110 is forced into the first input mode by the mode switching part 123, so that, with the lighting of the lighting parts 111Bb and 111Cb kept emphasized, it is possible to unlock the doors and open the side windows. This is to make the parts that function as the power window switch and the door lock switch stand out, so that they can be operated quickly when an emergency occurs. As a result of this, even if it is difficult for the user to think calmly, the user's likelihood to perform the operations for securing an exit quickly and appropriately is improved.

Also, when the vehicle 10 is submerges in water and switches to the first input mode, all of the four FR (right front), FL (left front), RR (right rear), and RL (left rear)) side windows may open by pressing the part of the lighting part 111Bb of the operating part 110. In this case, for example, the operating part 110 may be configured such that only the side window on the driver's seat side opens when that part of the lighting part 111Bb is pressed, but it is more preferable to open all of the side windows to secure an exit because there might be passengers in seats other than the driver's seat.

When the vehicle 10 submerges in water, the lighting parts 111Bb and 111Cb are turned on as shown in FIG. 3B, so that, even in an emergency such as the submersion of the vehicle 10 in water, it is possible to make the switch (lighting part 111Bb) for opening the side windows and the switch (lighting part 111Cb) for unlocking the doors stand out, to the user of the vehicle 10. By this means, when an emergency occurs, only the switches that need to be operated are lit and stand out, so that it is possible to prevent the user of the vehicle 10 from operating the wrong parts.

Also, although the display shown in FIG. 3B is provided by controlling the LED control part 124 to turn on the LEDs 112 corresponding to the lighting parts 111Bb and 111Cb when the control part 120 is operable, even when the control part 120 is inoperable, it is still possible to maintain the state in which the LEDs 112 corresponding to the lighting parts 111Bb and 111Cb are turned on.

When the control part 120 becomes inoperable, the relay device 135 operates such that only the LEDs 112 corresponding to the lighting parts 111Bb and 111Cb are turned on without involving the control part 120, thus providing a state in which the power window motor 160A and the door lock actuator 160B can be driven directly through the touch pad 111. Therefore, even when the vehicle 10 submerges in water and the control part 120 becomes inoperable due to the depth of the water, the display of the operating part 110 shown in FIG. 3B can be maintained, and the state in which the side windows can be opened and closed and the doors can be unlocked can be maintained. Even if the control part 120 becomes inoperable, the switch for opening the side windows (lighting part 111Bb) and the switch for unlocking the doors (lighting part 111Cb) stand out, and the power window motor 160A and the door lock actuator 160B are kept operable, thereby allowing the user of the vehicle to secure an exit even in a state in which the control part 120 is so sunk in water that it is no longer operable.

Note that the input device 100 may include LEDs that are turned on only in the second input mode, apart from the LEDs 112 described herein. Such LEDs may be provided at positions different from the positions where the LEDs 112 are provided in the input device 100, and output light toward lighting parts other than the lighting parts 111Ab to 111Eb.

Also, although an example is described herein with this embodiment in which the housing 110A having the lighting parts 111Ab to 111Eb is built in two-color molding, the lighting parts 111Ab to 111Eb are by no means limited to the above structure. The operating part 110 has only to include a configuration whereby certain lighting parts can be lit with emphasis, and, for example, it is possible to employ a structure here in which the operating part includes a printed film and a light source that can be used instead of the LEDs 112. Also, the operating part 110 may be a display mechanism including a liquid crystal display, an organic EL display, a micro LED display, and the like. In these cases, the liquid crystal display, the organic EL display, and the micro LED display serve as lighting parts.

Also, with this embodiment, an example will be described in which the lighting parts 111Bb and 111Cb are arranged at positions overlapping parts of the touch pad for operating the vehicle's side windows (windows) or door locks in plan view. However, if the operating part 110 has multiple touch switches instead of the touch pad 111, the lighting parts 111Bb and 111Cb are simply examples of lighting parts that are arranged at positions overlapping at least one touch switch for operating the side window or the door locks of the vehicle in plan view.

Figure 4B:
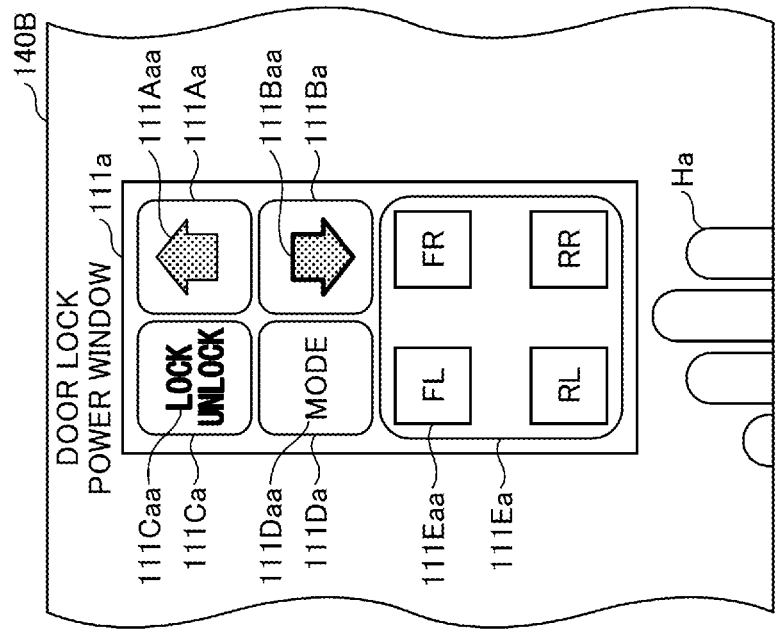
FIGS. 4A and 4B show representational images displayed on a HUD 140B.
Figure 4A:
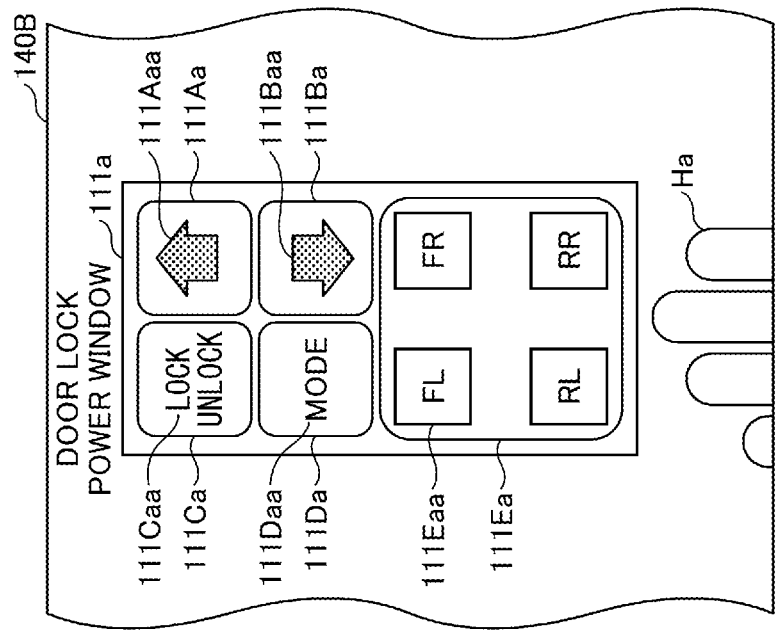

FIGS. 4A and 4B show representational images displayed on the HUD 140B. Below, the display on the HUD 140B will be described as an example, but the same applies to the display on a display 140C as well. FIG. 4A shows an example display on the HUD 140B when the operating part 110 is set to the first input mode at a normal time and a hand H approaches the operating part 110. When the operating part 110 is set to the first input mode, representational images 111a, 111Aa to 111Ea, and 111Aaa to 111Eaa are displayed on the HUD 140B. The representational images 111a, 111Aa to 111Ea, and 111Aaa to 111Eaa are constructed by a graphical user interface (GUI). Note that the representational images 111Aaa to 111Eaa are not displayed when the operating part 110 is set to the first input mode at a normal time and the hand H is not approaching the operating part 110.

The representational image 111a is a representational image of the operating part 110 (see FIG. 3A). The representational images 111Aa to 111Ea are representational images of the areas 111A to 111E (see FIG. 3A). The representational images 111Aaa to 111Eaa are representational images that show the functions assigned to the areas 111A to 111E of the operating part 110 in the first input mode. Therefore, the representational images 111Aaa to 111Daa are, respectively, an upward arrow for closing the side windows, a downward arrow for opening the side windows, and letters for switching between locking ("Lock") and unlocking ("Unlock") the doors, and letters ("Mode") for switching the input mode of the operating part 110. Also, the representational image 111Eaa represents the letters "FR," "FL," "RR," and "RL," which refers to the four side windows of the vehicle 10, and the square contours surrounding the letters "FR," "FL," "RR," and "RL." The representational images 111Aaa to 111Daa are displayed superimposed over the representational images 111Aa to 111Ea.

Also, the first input mode is an input mode for opening and closing the side windows and switching the door locks, so that the letters "Door Lock" and "Power Window" are displayed above the representational image 111a.

Also, in FIG. 4A, a representational image Ha of the user's hand H, is displayed on the HUD 140B. In FIG. 4A, the representational image Ha does not overlap the representational images 111a, 111Aa to 111Ea, and 111Aaa to 111Eaa because the actual position of the hand H has not reached the operating part 110. The positions where the representational image 111a of the operating part 110, the representational images 111Aa to 111Ea of the areas 111A to 111E, and the representational images 111Aaa to 111Eaa of the symbols are displayed are fixed in the image displayed on the HUD 140B, the position of the representational image Ha of the user's hand H is updated in a timely manner based on the position of the hand H captured by the camera 140A.

Therefore, the user can know the relative positional relationship between his/her own hand H and the operating part 110 while viewing the display on the HUD 140B. As a result of this, the user driving the vehicle can determine the relative positional relationship between his/her hand H and the operating part 110 simply by looking at the content displayed on the HUD 140B. Since the user does not need to look down to the operating part 110, both the accuracy of the user's input operations and the safety of driving can be improved.

Note that the representational images 111a, 111Aa to 111Ea, 111Aaa to 111Eaa, and Ha are used so as to reduce the calculation load of the AR control part 126. However, in the event the processing speed of the AR control part 126 is fast enough, the actual images of the operating part 110 and the hand H captured by the camera 140A may be displayed on the HUD 140B. Also, the representational images 111a, 111Aa to 111Ea, and 111Aaa to 111Eaa may be superimposed and displayed over the images of the actual operating part 110 and the hand H.

The control part 120 detects the approach of the hand H to the touch pad 111 based on output of the touch pad 111. Also, the control part 120 detects the approach of the hand H to the operating part 110 by using images captured by the camera 140A. For example, when the image of the hand H is not in the field of view of the camera 140A, the control part 120 may detect the approach of the hand H to the touch pad 111 based on output of the touch pad 111. Also, when an image of the hand H is included in an image captured by the camera 140A, the control part 120 may detect the relative position of the hand H and the operating part 110 by performing image processing. When detecting the relative positions of the hand H and the operating part 110 by image processing, the output of the touch pad 111 may also be used to detect the positional relationship between the hand H and the operating part 110. Such control may be performed by the operation detection part 122.

When the operation detection part 122 detects the approach of the hand H to the operating part 110, the AR control part 126 controls the HUD 140B to display the representational images 111a, 111Aa to 111Ea, and 111Aaa to 111Eaa, which are images of the operating part 110 and its surroundings, and a representational image Ha, which represents the hand H.

Also, when the positions of the hand H and the operating part 110 overlap, the AR control part 126 changes the representational image Ha of the hand H to transparent display. The AR control part 126 superimposes the representational images 111Aa to 111Ea of the areas 111A to 111E and the representational images 111Aaa to 111Eaa representing the functions assigned to areas 111A to 111E, with the representational image Ha, and display these representational images. This configuration enables the user to easily know in which positions operations should be made.

Here, examples of interfaces that represent the operating part 110 include: the representational images 111Aa to 111Ea of the areas 111A to 111E; the representational image 111Aaa of a symbol (upward arrow) for closing the side windows; the representational image 111Baa of a symbol (downward arrow) for opening the side windows; the representational image 111Caa of the letters for switching between locking ("Lock") and unlocking ("UnLock") the doors; the representational image 111Daa of the letters for switching the input mode in the operating part 110; and the representational image 111Eaa of the letters "FR," "FL," "RR," and "RL" for the side windows.

Also, FIG. 4B shows the display of the HUD 140B when the vehicle 10 submerges in water. When the vehicle 10 submerges in water, the input mode of the operating part 110 is forced to the first input mode, and the operating part 110 enters the first lighting state in which only the lighting parts 111Bb and 111Cb are illuminated (see FIG. 3B). Accompanying this, the display of the HUD 140B displays the representational images 111Aa to 111Ea and 111Aaa to 111Eaa, which relate to the opening and closing of the side windows and the switching of the door locks, corresponding to the first input mode, as shown in FIG. 4B. At the same time, the downward arrow of the representational image 111Baa and the letters "Lock" and "UnLock" of the representational image 111Caa are switched to display in bold. The bold display of the downward arrow in the representational image 111Baa and the letters "Lock" and "UnLock" in the representational image 111Caa is an example of emphasized display on the HUD 140B. Note that, in the display of the HUD 140B as well, "emphasis" means displaying a part to be emphasized in a more noticeable manner than other parts.

The position where the operation for opening the side windows and the position where the operation for unlocking the doors are displayed with emphasis on the HUD 140B, so that, even if the vehicle 10 submerges in water, as long as the control part 120 is operable, the user of the vehicle 10 can perform the operation to open the side windows and/or the operation to unlock the doors by watching the display on the HUD 140B. Since the user can operate the side windows or the door locks by watching the display on the HUD 140B, even when an emergency such as the submersion of the vehicle 10 in water occurs, the user can prepare for escape without looking down at the operating part 110. In particular, it is effective when the user cannot look down for some reason.

Note that an example has been described with reference to FIGS. 3A and 3B in which the lighting part 111Bb having the shape of a symbol (downward arrow) for opening the side windows, and the lighting part 111Cb having the shape of a symbol for switching between locking ("Lock") and unlocking ("Unlock") the doors, are displayed with emphasis by the operating part 110 only when the vehicle 10 submerges in water. However, the operating part 110 may be configured such that only the lighting parts 111Bb and 111Cb are lit with emphasis, not only when the vehicle 10 submerges in water, but also at normal times. In this case, the HUD 140B may display all of the representational images 111a, 111Aa to 111Ea, and 111Aaa to 111Eaa. According to this configuration, it becomes easier to recognize common points between the lighting state of the touch pad 111 and the content displayed on the HUD 140B, so that the user of the vehicle 10 is able to know, on a daily basis, where, in the operating part 110, parts that are important when an emergency occurs are arranged. Therefore, as the user repeats using the operating part 110 at normal times, the operating positions in the area 111B where the arrow for opening the side windows is displayed with emphasis, and in the area 111C where the letters for switching between locking and unlocking the doors are displayed with emphasis become more memorable to the user. If the positions to be operated to escape from the vehicle 10 are memorized, the user is more likely to be able to perform the operation for unlocking the doors or the operation for opening the side windows even in a situation in which the vehicle 10 is sunk in water and it is difficult to think calmly. As a result of this, it is possible to provide a situation in which the user of the vehicle 10 can easily escape from the vehicle 10.

FIGS. 5A, 5B, and 5C and FIGS. 6A and 6B show displays on the HUD 140B. The AR control part 126 reflects the positional relationship between the operating part 110 and the hand H included in images captured by the camera 140 in the positional relationship between the representational images 111a and Ha displayed on the HUD 140B. That is, the HUD 140B moves the position of the representational image Ha in a timely manner according to changes in the actual position of the hand H.

FIG. 5A shows the representational images 111Aa to 111Ea, representing the areas 111A to 111E assigned to the touch pad 111 in plan view when the hand H is not close to the touch pad 111 at a normal time. When the hand H is not close to the touch pad 111, the representational images 111Aa to 111Ea (see FIG. 4A) such as arrows representing the functions assigned to the areas 111A to 111E are not shown in the representational images 111Aa to 111Ea. Note that, according to this embodiment, the representational images 111Aa to 111Ea displayed on the HUD 140B show the entirety of the areas 111A to 111E of the operating part 110. However, for example, even if the areas 111A to 111E are shown enlarged and part of the areas 111A to 111E cannot be displayed, this is not a problem insofar as what the HUD 140B displays does not contradict the areas 111A to 111E of the operating part 110.

FIG. 5B shows the representational images 111Aa to 111Ea and 111Aaa to 111Eaa and the representational image Ha representing the hand H when the operating part 110 is set to the first input mode at a normal time. As shown in FIG. 5B, when the hand H approaches the operating part 110, the control part 120 superimposes and displays the symbol for closing the side windows (upward arrow), the symbol for opening the side windows (downward arrow), the letters for switching between locking ("Lock") and unlocking ("Unlock") the doors, the letters ("Mode") for switching the input mode in the operating part 110, and the representational images 111Aaa to 111Eaa of the letters "FR," "FL," "RR" and "RL" for the side windows, over the representational images 111Aa to 111Ea. The content displayed on the HUD 140B shown in FIG. 5B are the same as those of the HUD 140B shown in FIG. 4A.

When the hand H approaches the operating part 110 further and overlaps the operating part 110, the control part 120 emphasizes the representational image 111Aaa and the representational image 111Caa, located at the fingertip in the representational image Ha, as shown in FIG. 5C. That is, the control part 120 displays, with emphasis, the representational image 111Aaa (upward arrow), which is for closing the side windows, and which is superimposed and displayed over the representational image 111Aa, and the representational image 111Caa, which represents the letters "Lock" and "Unlock," and which is superimposed and displayed over the representational image 111Ca. The upward arrow of the representational image 111Aaa and the letters of the representational image 111Caa are displayed in bold and thus emphasized.

Also, FIG. 5C shows a state in which the front right (FR) side window, which is the side window of the driver's seat, is selected, and the representational image 111Fa is displayed. As an example, when the vehicle 10 is a right-hand drive vehicle and the front right (FR) side window is selected, a representational image 111Fa of a mark of the side window of the driver's seat is displayed between the representational images 111Aa and 111Ba. The letters "Driver" are displayed in the representational image 111Fa.

Also, since, in FIG. 5C, the side window is already selected, the representational image 111Ea of the letters "FR," "FL," "RR," and "RL," is not displayed in the representational image 111Ea (see FIG. 5B). Since the side window is already selected, the representational image 111Eaa of the letters "FR," "FL," "RR," and "RL" is not displayed. Note that, when a side window other than that of the driver's seat is selected, a representational image including the letters "FL," "RR," and "RL," instead of the letters "Driver," may be displayed as a representational image 111Fa.

Also, in FIG. 5C, the representational image Ha of the hand H is made semi-transparent, and the representational images 111Aa to 111Ea, 111Aaa to 111Daa, and 111Fa, which overlap the representational image Ha of the hand H, are displayed to look pale. By this means, the representational images 111Aa to 111Ea, 111Aaa to 111Daa, and 111Fa, which overlap the representational image Ha of the hand H, can be identified. In FIG. 5C, the dashed lines indicate the contours of parts where the representational images 111Aa to 111Ea are displayed to look pale.

Note that, although, here, the upward arrow in the representational image 111Aaa and the letters in the representational image 111Caa are emphasized by displaying them thicker than in FIG. 5B, it is equally possible to make these letters flash intermittently, or display them larger than those shown in FIG. 5B. Also, it is possible to change the color of these letters to a color that is different from that shown in FIG. 5B, or increase their luminance. Also, the thickness of the letters shown in FIG. 5B may be changed so as to pulsate, or these letters may be displayed as enclosed letters in which the part to be emphasized is enclosed in a frame. Displaying with emphasis can be thus achieved by various techniques. Also, the display of representational images with emphasis based on such various techniques may be applied to the representational images 111Baa and 111Caa when the vehicle 10 submerges in water, as shown in FIG. 4B.

Figure 6A:
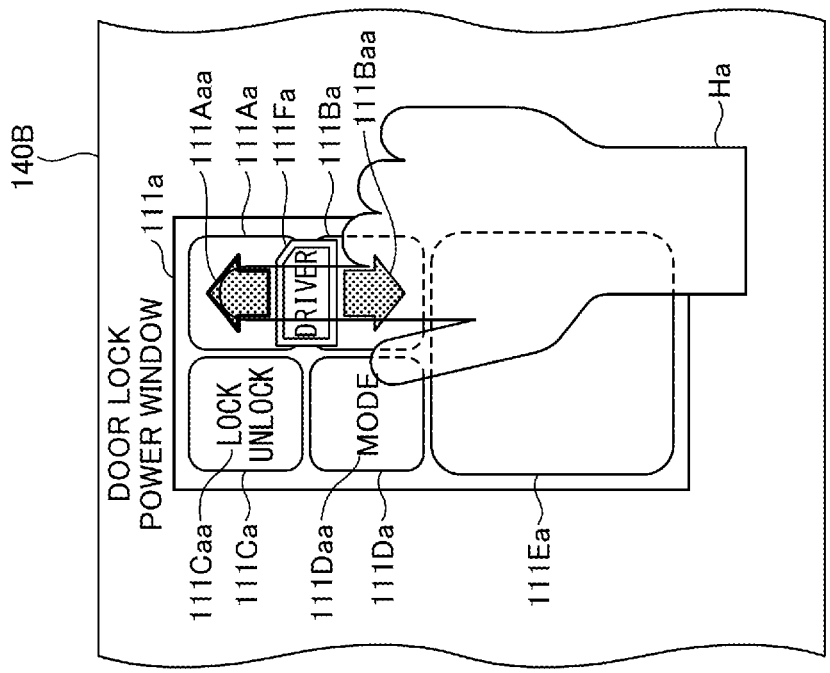
FIGS. 6A and 6B show display on the HUD 140B.
Figure 6B:
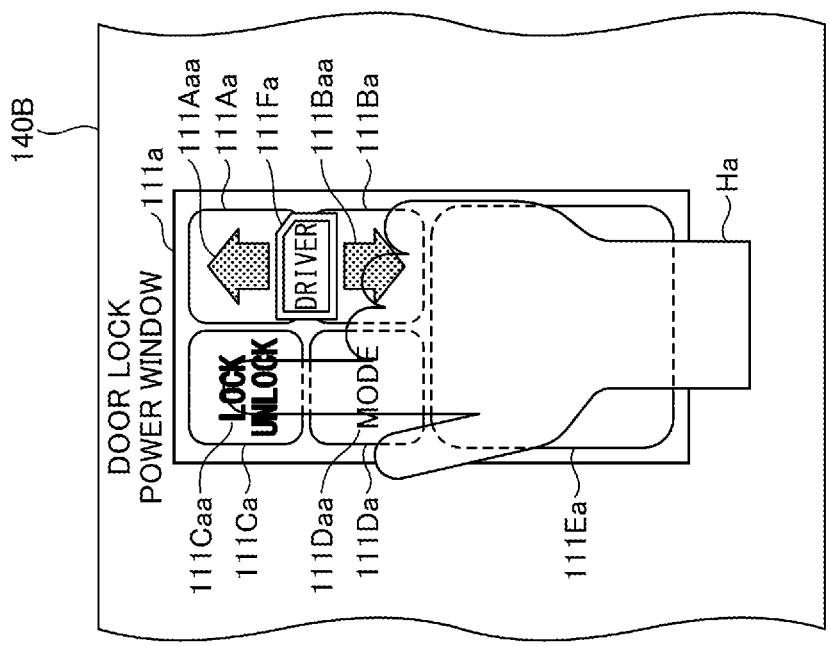

When the fingertip of the hand H is positioned over the area 111C, as shown in FIG. 6A, the control part 120 displays, with emphasis, the representational image 111Caa of the letters for switching between locking ("Lock") and unlocking ("Unlock") the doors, superimposed and displayed over the representational image 111Ca displayed on the HUD 140B. Also, when the fingertip of the hand H is positioned over the area 111A, as shown in FIG. 6B, the control device 120 displays the representational image 111Aaa of the symbol (upward arrow) for closing the side windows with emphasis, superimposed and displayed over the representational image 111Aa positioned at the fingertip of the representational image Ha. Note that, instead of showing the representational image 111Aaa in bold, the display thereof may be emphasized by changing its color, increasing its luminance, changing the thickness of the lines that make up letters in a pulsating manner, or displaying a frame around the part to be emphasized.

Note that, in FIGS. 6A and 6B, similar to FIG. 5C, the front right (FR) side window, which is the side window of the driver's seat, is selected and the representational image 111Fa is displayed, and therefore the representational image 111Eaa (see FIG. 5B) that shows the letters "FR," "FL," "RR," and "RL" is not displayed in the representational image 111Ea.

FIGS. 7A and 7B show the display of the HUD 140B in the first input mode and the second input mode. FIG. 7A shows the display on the HUD 140B when the first input mode is selected and the power windows and door locks can be operated. The representational image 111a representing the operating part 110 (see FIG. 3A) is displayed on the HUD 140B. The letters "Door Lock" and "Power Window"

are displayed in the upper part of the representational image 111a. Also, the representational images 111Aa to 111Ea, representing the areas 111A to 111E, are displayed below the letters "Door Lock" and "Power Window." Also, the representational images 111Aaa to 111Eaa such as letters representing the functions assigned to the areas 111A to 111E are superimposed and displayed over the representational images 111Aa to 111Ea. That is, the representational image 111Aaa of the symbol (upward arrow) for closing the side windows is displayed on the representational image 111Aa, and the representational image 111Baa of the symbol (downward arrow) for opening the side windows is displayed in the representational image 111Ba. Also, the representational image 111Caa of the letters for switching between locking ("Lock") and unlocking ("Unlock") of the doors is displayed in the representational image 111Ca. The representational image 111Daa of the letters indicating mode selection ("Mode") is displayed in the representational image 111Da. The representational image 111Eaa of the letters ("FR," "FL," "RR," and "RL") indicating the positions of seats in the vehicle is displayed in the representational image 111Ea. This display on the HUD 140B is equivalent to the display shown in FIG. 4B minus the representational image Ha of the hand H.

FIG. 7B shows the display on the HUD 140B in the air-conditioning input mode among the second input modes. The representational image 111a representing the operating part 110 (see FIG. 3A) is displayed on the HUD 140B. The letters "Air Conditioner" are displayed in the upper part of the representational image 111a, and representational images (111Aa to 111Ea) of areas (111A to 111E) are displayed below the letters "Air Conditioner." Also, in the representational image 111Aa, a representational image 111Aab of a symbol (upward arrow) for increasing the set temperature is displayed. In the representational image 111Ba, a representational image 111Bab of a symbol (downward arrow) for lowering the set temperature is displayed. Also, in the representational image 111Ca, a representational image 111Cab of the letters for the automatic mode ("Auto") is displayed. In the representational image 111Da, a representational image 111Dab representing mode selection ("Mode") is displayed. Also, four representational images 111Eab are displayed in the representational image 111Ea. These four representational images 111Eab are: a representational image for selecting the mode for setting the wind direction and defroster, shown in the upper right part; a representational image for selecting the mode for setting the air volume of the fan, shown in the lower right part; a representational image for selecting the mode for setting the temperature, shown in the upper left part; and a representational image for selecting the mode for setting inner air circulation, shown in the lower left part.

FIG. 7C shows the display on the HUD 140B in the audio input mode among the second input modes. A representational image 111a of the operating part 110 (see FIG. 3A) is displayed on the HUD 140B. The letters "Audio" are displayed in the upper part of the representational image 111a, and the representational images 111Aa to 111Ea are displayed below the letters "Audio." In the representational image 111Aa, a representational image 111Aac of the letters for radio station selection ("Tune") is displayed. A representational image 111Bac of a symbol for muting is displayed in the representational image 111Ba. Also, representational letters 111Cac for audio data input source selection ("Source") are displayed in the representational image 111Ca. A representational image 111Dac of letters for mode selection ("Mode") is displayed in the representational image 111Da. Also, four representational images 111Eac are displayed in the representational image 111Ea. These four representational images 111Eac are: a representational image of a play-start mark, shown in the upper right part; a representational image for fast forward, shown in the lower right part; a representational image for stop, shown in the upper left part; and a representational image for rewinding, shown in the lower left part.

Note that the content displayed on the HUD 140B in the audio input mode described in this embodiment is simply an example, and various changes can be made. For example, the above-described representational images 111Aac to 111Eac displayed over the representational images 111Aa to 111Ea may be configured to be freely adjustable in accordance with the user's will. In this case, the audio functions assigned to the areas 111A to 111E of the operating part 110 may be changed accordingly.

As shown in FIG. 7A to FIG. 7C, the content displayed on the HUD 140B is switched according to the input mode selected by an input operation made to the operating part 110. Also, although the representational image Ha of the hand H is omitted in FIG. 7A to FIG. 7C, as in FIG. 5B, FIG. 5C, FIG. 6A, and FIG. 6B, the position of the representational image Ha of the hand H displayed on the HUD 140B may be changed in a timely manner depending on the actual position of the hand H relative to the operating part 110 captured by the camera 140. The content displayed on the HUD 140B is controlled thus by the AR control part 126.

Figure 8:
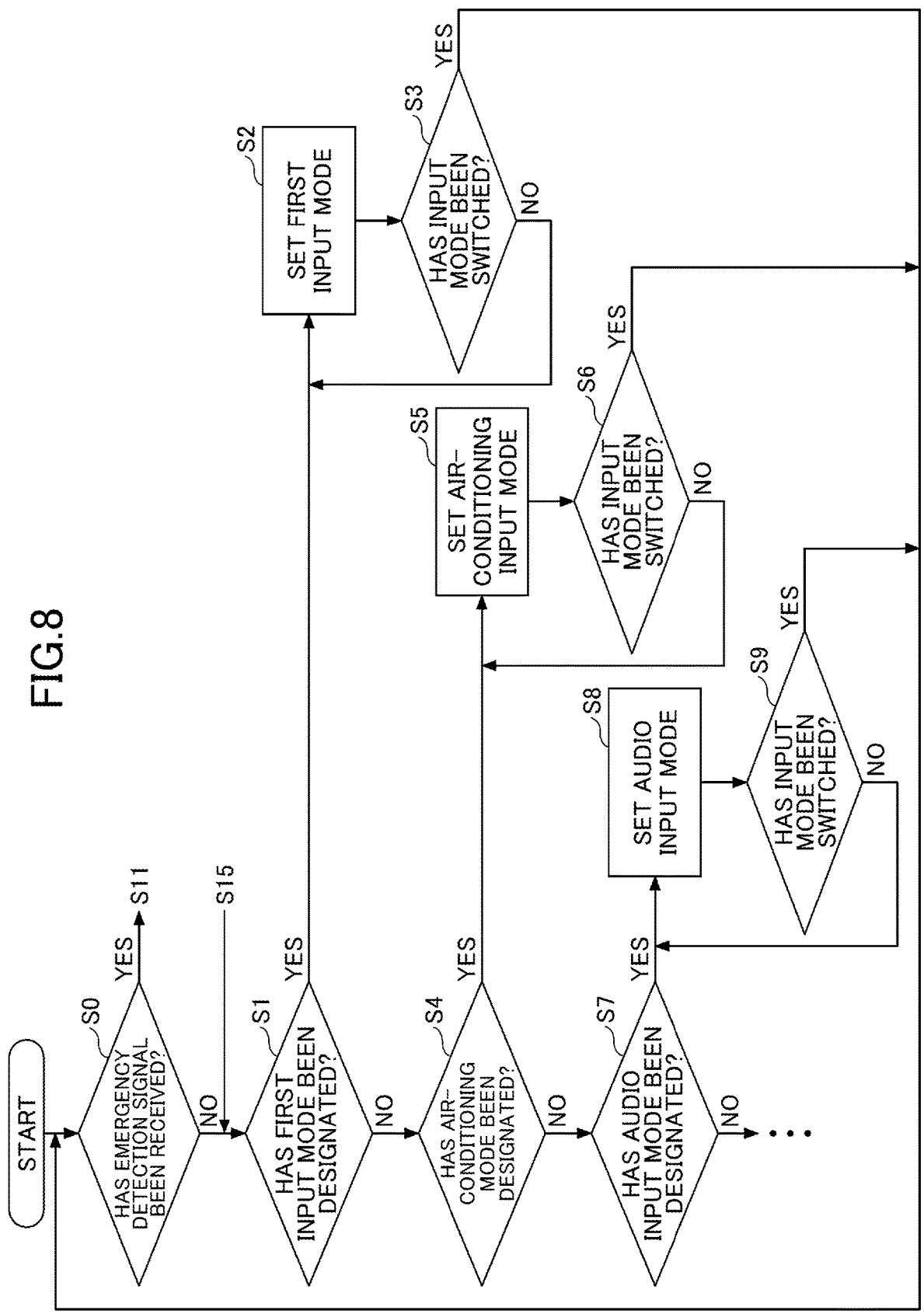
FIG. 8 shows the process that a control part 120 performs to set an input mode in an operating part 110.
Figure 9:
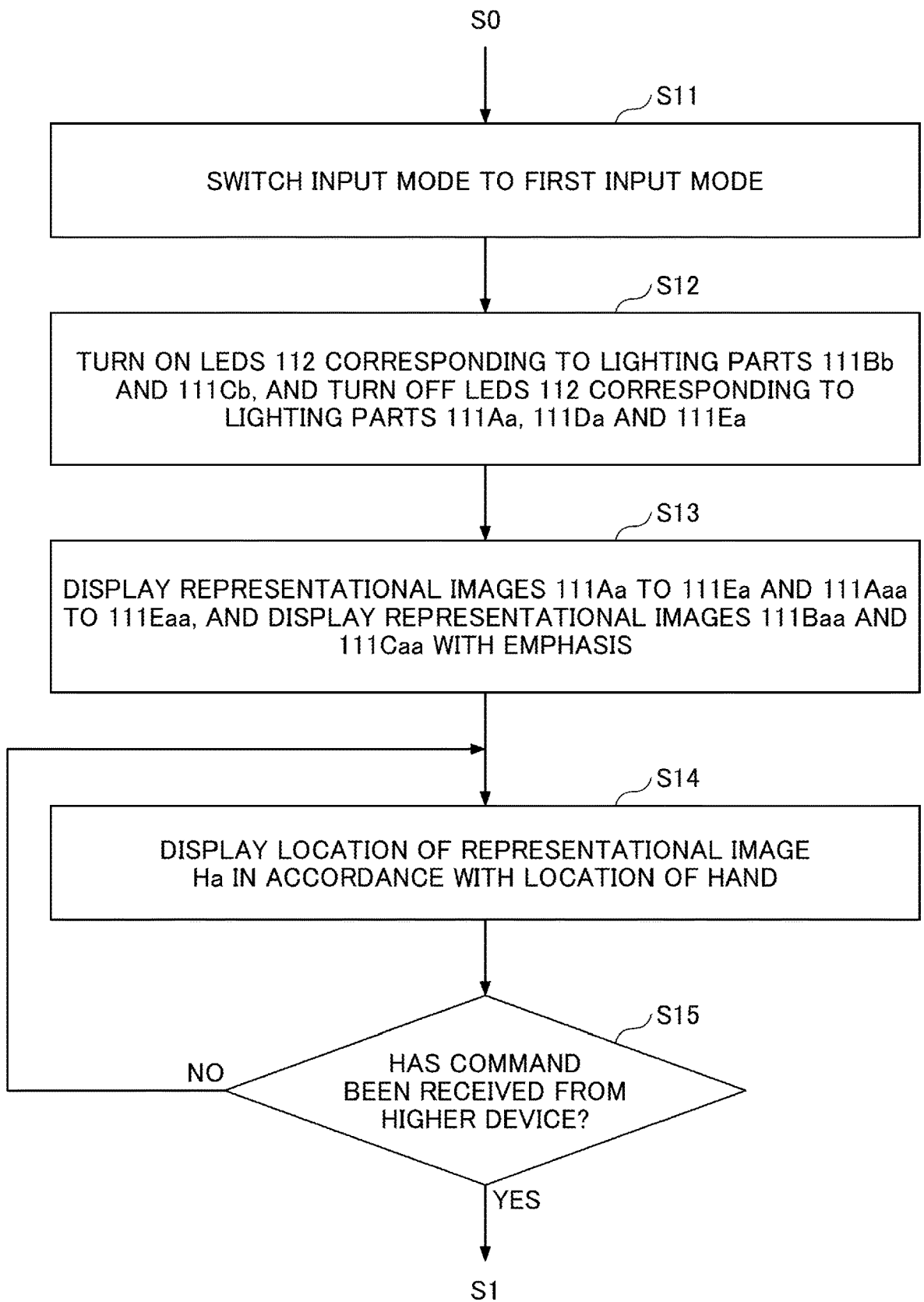
FIG. 9 shows the process by which the control part 120 switches the input mode and display when an emergency occurs.

FIG. 8 shows the process executed by the control part 120 to set the input mode of the operating part 110. FIG. 9 shows the process in which the control part 120 switches the input mode and display when an emergency occurs. The mode switching part 123 switches the input mode of the operating part 110; the LED control part 124 switches the lighting state of the operating part 110; and the AR control part 126 switches the display of the HUD 140B.

When the process of FIG. 8 is started, the control part 120 performs the following steps:

The mode switching part 123 determines whether an emergency detection signal has been received (step S0). When the submersion sensor 130 detects that the vehicle 10 is sunk in water, the submersion sensor 130 generates an emergency detection signal and sends it to the control part 120. The mode switching part 123 monitors whether an emergency detection signal is received.

When the mode switching part 123 determines that an emergency detection signal has been received (S0: YES), the mode switching part 123 starts the process for the time of an emergency shown in FIG. 9.

When the emergency process shown in FIG. 9 is started, the mode switching part 123 forcibly switches the input mode of the operating part 110 to the first input mode (step S11). As a result of this, when the vehicle 10 submerges in water, the operating part 110 can perform the operation of opening the side windows and the operation of unlocking the doors, without the user performing the operation of selecting the first input mode. The operation of selecting the input mode is an example of a mode selection operation.

The LED control part 124 turns on the LEDs 112 corresponding to the lighting part 111Bb representing a downward arrow for opening the side windows and the lighting part 111Cb representing the letters for switching between locking and unlocking the doors, and turns off the LEDs 112 corresponding to the lighting parts 111Ab, 111Db, and 111Eb (step S12). In step S12, if the lighting parts 111Bb and 111Cb are already lit, the LED control part 124 keeps the lighting parts 111Bb and 111Cb lit. As a result of this, the operating part 110 enters the state shown in FIG. 3B, and the positions to perform operations for opening the side windows and doors, which serve as an emergency exit, are illuminated with emphasis and clearly indicated to the user.

As shown in FIG. 4B, the AR control part 126 displays the representational images 111Aa to 111Ea and 111Aaa to 111Eaa, corresponding to the first input mode and related to the opening and closing of the side windows and the switching of the door locks, and also changes the content displayed on the HUD 140B such that the downward arrow of the representational image 111Baa and the letters "Lock" and "Unlock" of the representational image 111Caa are displayed with emphasis (step S13). As a result of this, on the display of the HUD 140B, too, operation positions related to the operations of opening the side windows and the doors in an emergency are displayed in a noticeable manner.

The AR control part 126 determines the position of the hand H with respect to the operating part 110 based on images captured by the camera 140A, and displays the representational image Ha of the hand H on the HUD 140B (step S14).

After completing step S14, the control part 120 determines whether or not a command has been received from a higher device (step S15). Here, examples of the higher device include an ECU (Electronic Control Unit) or the like that controls some of the devices in the vehicle 10. For example, when the submersion sensor 130 no longer detects the submersion of the vehicle 10 in water, the ECU sends a command to the control part 120 to let the control process of the control part 120 switch from the emergency process to the normal process.

When the control part 120 determines that no command has been received from the higher device (S15: NO), the control part causes the AR control part 126 to repeat the process of step S14, so as to update the display of the HUD 140B according to the movement of the hand H.

On the other hand, when the control part 120 determines that a command has been received from the higher device (S15: YES), the flow moves on to step S1 shown in FIG. 8, so as to resume the process for normal times.

When the AR control part 126 repeats the process of step S14, the display of the HUD 140B is updated according to the movement of the hand H, as long as the control part 120 is operable. Also, when the control part 120 submerges in water and becomes inoperable, power is supplied from the battery 170 to the LEDs 112 corresponding only to the lighting parts 111Bb and 111Cb, through the relay device 135, and the lighting parts 111Bb and 111Cb are lit. Also, at this time, the power window motor 160A and the door lock actuator 160B can be operated directly by making input operations to the operating part 110. Even if the control part 120 becomes inoperable, the lighting parts 111Bb and 111Cb of the operating part 110 are kept lit with emphasis, and the power window motor 160A and the door lock actuator 160B are kept operable, so as to allow the user to secure an exit.

Also, when the mode switching part 123 determines that no emergency detection signal has been received (S0: NO) in step S0 shown in FIG. 8, and when the control part 120 determines that a command has been received from the higher device in step S15 shown in FIG. 9 (S15: YES), the control part 120 starts the process for normal times from step S1 onward.

The mode switching part 123 determines whether the first input mode has been designated the input mode of the operating part 110, based on the details of operation detected by the operation detection part 122 (step S1).

When the mode switching part 123 determines that the first input mode has been designated (S1: YES), the mode switching part 123 sets the input mode of the operating part 110 to the first input mode (step S2). Thereupon the power windows and door locks becomes operable via the operating part 110. Note that the mode switching part 123 determines that the first input mode has been designated (S1: YES) when the first input mode is specified to switch from the state in which the input mode of the operating part 110 is not set, to the state in which the first input mode is set; and when the first input mode is specified in order to switch from the state in which the input mode of the operating part 110 is set to the second input mode, to the state in which it is set to the first input mode. Note that, if an operation is made in the area 111D of the operating part 110 during step S2, the determination is made in next step S3.

The mode switching part 123 determines whether the input mode has been switched, based on the details of operation detected by the operation detection part 122 (step S3).

When the mode switching part 123 determines that the input mode has not been switched (S3: NO), the flow returns to step S2, and the input mode of the operating part 110 is set to the first input mode (step S2). This is the case where the first input mode is already set and the mode is not switched. As a result of this, the state is maintained in which the power windows and door locks can be operated through the touch pad 111.

When the mode switching part 123 determines that the input mode has been switched (S3: YES), the flow returns to step S1, to determine whether or not the mode has been switched to the first input mode.

When the mode switching part 123 determines in step S1 that the first input mode is not specified (S1: NO), the mode switching part 123 determines whether the air-conditioning input mode, among the input modes included in the second input modes, has been selected (step S4).

When the mode switching part 123 determines that the air-conditioning input mode has been designated (S4: YES), the mode switching part 123 sets the input mode of the operating part 110 to the air-conditioning input mode (step S5). This allows operation of the air conditioner through the operating part 110. Note that, if an operation is made in the area 111D of the operating part 110 during step S5, the determination is made in next step S6.

The mode switching part 123 determines whether the input mode has been switched, based on the details of operation detected by the operation detection part 122 (step S6).

When the mode switching part 123 determines that the input mode has not been switched (S6: NO), the flow returns to step S5, and the input mode of the operating part 110 is set to the air-conditioning input mode (step S2). As a result of this, the state is maintained in which the air conditioner can be operated through the operating part 110.

When the mode switching part 123 determines that the input mode has been switched (S6: YES), the flow returns to step S1.

When the mode switching part 123 determines in step S4 that the air-conditioning input mode is not designated (S4: NO), the mode switching part 123 determines whether the audio input mode, among the input modes included in the second input modes, has been designated (step S7).

When the mode switching part 123 determines that the audio input mode has been designated (S7: YES), the mode switching part 123 sets the input mode of the operating part 110 to the audio input mode (step S8). This allows operation of the audio system through the operating part 110. Note that, if an operation is made in the area 111D of the operating part 110 during step S8, the determination is made in the next step S9.

The mode switching part 123 determines whether the input mode has been switched based on the details of operation detected by the operation detection part 122 (step S9).

When the mode switching part 123 determines that the input mode has not been switched (S8: NO), the flow returns to step S8, and the input mode of the operating part 110 is set to the audio input mode (step S8). As a result of this, the state in which the audio system can be operated through the operating part 110 is maintained.

When the mode switching part 123 determines in step S7 that the audio input mode is not specified (S7: NO), the mode switching part 123 may determine whether an input mode other than the air-conditioning input mode or the audio input mode included in the second input modes has been set, and perform the same process as in steps S5 to S9. So, here, the process after the determination "NO" in step S7 is omitted. Also, when the input device 100 is powered off, the series of processes shown in FIG. 8 may be terminated.

Figure 10:
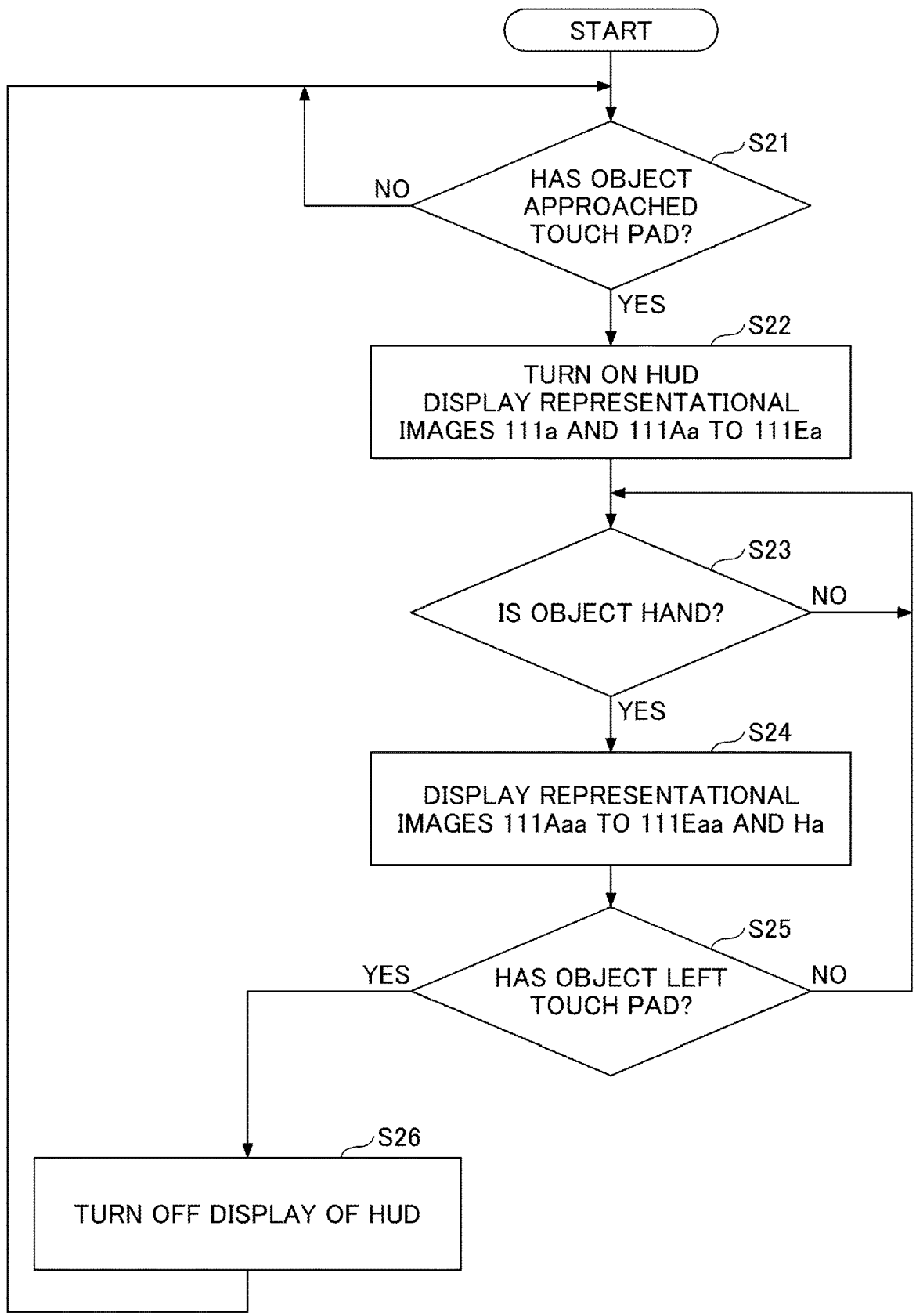
FIG. 10 shows the process that the control part 120 performs with respect to display on the HUD 140B.

FIG. 10 shows the process executed by the control part 120 regarding the display of the HUD 140B. When this process starts, the control part 120 performs the following process. Note that, here, the process when the input mode of the operating part 110 is the first input mode will be described.

The operation detection part 122 determines whether an object is approaching the operating part 110, based on output of the touch pad 111 (step S21). The operation detection part 122 detects whether an object is approaching the operating part 110 by detecting changes in capacitance caused when an object approaches the touch pad 111 provided inside the housing 110A of the operating part 110.

When the operation detection part 122 determines that an object is approaching the operating part 110 (S21: YES), the AR control part 126 activates the HUD 140B to display the representational images 111a and 111Aa to 111Ea (step S22). That is, the HUD 140B displays the image shown in FIG. 5A.

The operation detection part 122 determines whether the object is a hand H (step S23). The operation detection part 122 determines whether the object is a hand H based on images captured by the camera 140A.

When the operation detection part 122 determines that the object is a hand H (S23: YES), the AR control part 126 displays the representational images 111Aaa to 111Eaa, which represent the functions corresponding to the input mode selected by the operating part 110, and the representational image Ha of the hand H, on the HUD 140B (step S24). At this time, if the input mode of the operating part 110 is selected to the first input mode, the AR control part 126 displays images such as those shown in FIG. 4A, FIG. 5B, or FIG. 7A on the HUD 140B, depending on input operations made to the operating part 110. Also, if the input mode of the operating part 110 is set to the second input mode, the AR control part 126 displays the images shown in FIG. 7B and FIG. 7C, with an addition of the representational image Ha of the hand H, depending on input operations made to the operating part 110. The AR control part 126 performs image processing on images captured by the camera 140A to determine the positional relationship between the operating part 110 and the hand H, and reflects this in the position of the representational image Ha of the hand H.

The operation detection part 122 determines whether the object has left the operating part 110 (step S25). The operation detection part 122 determines whether the object has left the operating part 110 by detecting changes in capacitance.

When the operation detection part 122 determines that the object has not left the operating part 110 (S25: NO), the flow returns to step S23. As a result of this, the processes of steps S23 and S24 are performed, and the content displayed on the HUD 140B is updated.

Note that, when the operation detection part 122 determines in step S25 that the object has left the operating part 110 (S25: YES), the AR control part 126 turns off the display of the HUD 140B (step S26). The control part 120 repeats executing the above series of processes.

As described above, when the vehicle 10 submerges in water, the LEDs 112 corresponding to the lighting parts 111Bb and 111Cb are turned on as shown in FIG. 3B, so that the switch for opening the side windows and the switch for unlocking the doors in the operating part 110 can be displayed with emphasis. The LEDs 112 are turned on by the LED control part 124 while the control part 120 is operable. When, on the other hand, the control part 120 is inoperable, the relay device 135 operates and turns on the LEDs 112. Also, although the side windows' opening and closing have been described here, the description may apply to windows other than the side windows of the vehicle 10.

Therefore, it is possible to provide an input device 100 that can indicate the positions for operating the windows or door locks of the vehicle 10 when the vehicle 10 submerges in water. That is, since the position where the operation for opening the side windows should be performed and the position where the operation for unlocking the doors should be performed are illuminated, the user can intuitively make these operations. Therefore, it is possible to improve the user's likelihood to escape from the vehicle 10 in an emergency such as the submersion of the vehicle 10 in water.

Also, if the control part 120 is not sunk in water, the representational images 111Baa and 111Caa, out of the representational images 111a, 111Aa to 111Ea, and 111Aaa to 111Eaa on the HUD 140B, are displayed in an emphasized manner, so that the display of the HUD 140B also improves the user's likelihood to escape from the vehicle 10 in an emergency such as the submersion of the vehicle 10 in water.

Also, when the vehicle 10 submerges in water, the control part 120 may turn on the LEDs 112, corresponding to the lighting parts 111Bb and 111Cb provided in parts of the operating part 110 that function as power window switches and/or door lock switches in the first input mode, in a color that is different from that of normal times, so that, by this method of making emphasis by turning on the LEDs 112 in a color that is different from that of normal times, the lighting parts 111Bb and 111Cb can be made to stand out. This, as a consequence, makes it easier for the user to find the switch for opening the side windows and the switch for unlocking the doors in an emergency such as the submersion of the vehicle 10 in water.

Also, when the vehicle 10 submerges in water, the control part 120 may make the LEDs 112, corresponding to the lighting parts 111Bb and 111Cb provided in parts of the operating part 110 that function as power window switches and/or door lock switches in the first input mode, flash intermittently, so that, by this method of making emphasis by making the LEDs 112 flash intermittently, the lighting parts 111Bb and 111Cb can be made to stand out. This, as a consequence, makes it easier for the user to find the switch for opening the side windows and the switch for unlocking the doors in an emergency such as the submersion of the vehicle 10 in water.

Also, if the vehicle 10 submerges in water, the control part 120 may turn on the LEDs 112, corresponding to the lighting parts 111Bb and 111Cb provided in parts of the operating part 110 that function as power window switches and/or door lock switches in the first input mode, with a higher luminance than normal times, so that, by this method of making emphasis by turning on the LEDs 112 with a higher luminance than normal times, the lighting parts 111Bb and 111Cb can be made to stand out. This, as a consequence, makes it easier for the user to find the switch for opening the side windows and the switch for unlocking the doors in an emergency such as the submersion of the vehicle 10 in water.

Also, at normal times, the control part 120 may turn on the LEDs 112 corresponding to the lighting parts 111Bb and 111Cb provided in parts of the operating part 110 that function as power window switches and/or door lock switches in the first input mode, and turn off the other LEDs 112, so that, by this method of making emphasis by turning on only the LEDs 112 that correspond to the lighting parts 111Bb 111Bb and 111Cb even at normal times, the lighting parts 111Bb and 111Cb can be made to stand out. Therefore, it is possible for the user to remember the positions of the switch for opening the side windows and the switch for unlocking the doors even at normal times, so that, when the vehicle 10 submerges in water, the user can find the switch for opening the side windows and the switch for unlocking the door locks with ease.

Also, when the vehicle 10 submerges in water, the control part 120 may make the representational image 111Baa and the representational image 111Caa in the display of the HUD 140B, flash intermittently, where the representational image 111Baa represents the symbol (downward arrow) for opening the side windows, and the representational image 111Caa represents the letters for switching between locking and unlocking the doors, so that, by this method of making emphasis by making the representational image 111Baa and the representational image 111Caa flash intermittently, the representational image 111Baa and the representational image 111Caa can be made to stand out. This, as a consequence, allows the user to know the positions where operations need to be made to secure an exit from the vehicle 10, among the representational images 111a, 111Aa to 111Ea, and 111Aaa to 111Eaa displayed on the HUD 140B, in the time of an emergency such as the submersion of the vehicle 10 in water, and allows the user to find the switch for opening the side windows and the switch for unlocking the doors with ease.

Also, when the vehicle 10 submerges in water, the control part 120 may increase the size of the representational images 111Baa and 111Caa in the display of the HUD 140B, so that, by this method of making emphasis by showing an enlarged display, the representational images 111Baa and 111Caa can be made to stand out. This, as a consequence, allows the user to know the positions where operations need to be made to secure an exit from the vehicle 10, among the representational images 111a, 111Aa to 111Ea, and 111Aaa to 111Eaa displayed on the HUD 140B, in the time of an emergency such as the submersion of the vehicle 10 in water, and allows the user to find the switch for opening the side windows and the switch for unlocking the doors with ease.

Also, the representational images 111Baa and 111Caa can be emphasized by, for example, changing the color of the representational images 111Baa and 111Caa from normal times, increasing the luminance, changing the thickness of the lines of the representational images 111Baa and 111Caa over time so as to pulsate, displaying frames that surround the representational image 111Baa and 111Caa, and so forth. These methods of making emphasis also make it possible to indicate to the user the positions where operations need to be made to secure an exit from the vehicle 10, and allow the user to find the switch for opening the side windows and the switch for unlocking the doors with ease. Note that the details described above about the display on the HUD 140B may also apply to the display on the display 140C.

Note that, in the above description, the operating part 110 has areas 111A to 111E as shown in FIGS. 3A and 3B, but the structure shown in FIGS. 11A, 11B, and 11C may be adopted as well. FIGS. 11A, 11B, and 11C show the operating part according to a modification of the embodiment.

A structure with one area 111MA is possible, like the operating part 110M1 shown in FIG. 11A. By two-color molding, a structure with a translucent part 111MA1, in which a symbol (downward arrow) for opening the side windows can be lit in a part of the area 111MA (for example, in a part approximately ¼ of the entire area), may be employed. This is a simple structure, which can be manufactured at a lower cost, and which is suitable for vehicles with low prices and vehicles with simple interiors.

Also, like the operating part 110M2 shown in FIG. 11B, the operating part may have areas 111MA, 111MB, and 111MC, and the area 111MB may have a three-dimensional structure. FIG. 11C shows representational images 110a, 111MAa, 111MBa, and 111MCa displayed on the HUD 140B in audio input mode. The representational image 110a is a representational image of the housing of the operating part 110M2, and the representational images 111MAa, 111MBa, and 111MCa are representational images of the areas 111MA, 111MB and 111MC, respectively. A representational image 111MBaa of upward and downward arrows is superimposed and displayed over the fingertip of the representational image Ha of the hand H superimposed over the representational image 111MBa.

Figure 12B:
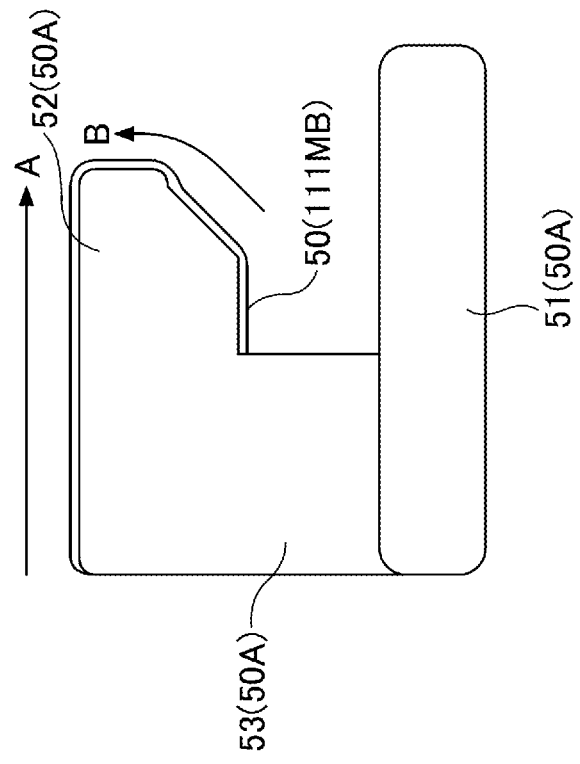
FIGS. 12A and 12B show the part of the area 111MB of the operating part 110M2 shown in FIG. 11B.
Figure 12A:
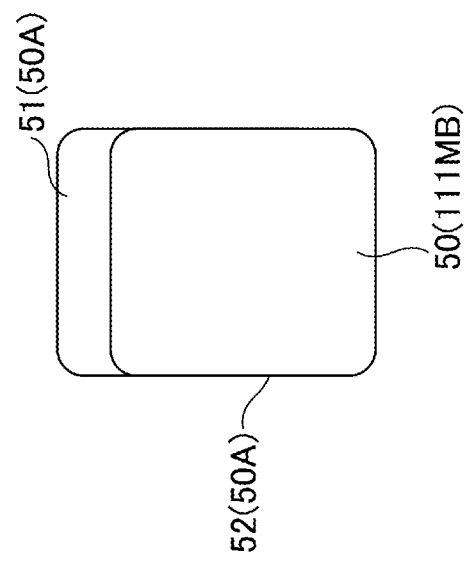

FIGS. 12A and 12B show the part of the area 111MB of the operating part 110M2 shown in FIG. 11B. FIG. 12A shows an extracted part of the area 111MB of the operating part 110M2. Here, the part of the area 111MB of the operating part 110M2 is referred to as a "touch pad part 50."

As shown in FIG. 12B, the touch pad part 50 is provided on the surface of a substrate 50A having a lower part 51, an upper part 52, and a connection part 53. The touch pad part 50 is a flexible touch pad that can be bent, and is bent over the lower surface, the side surfaces, and the upper surface of the upper step part 52 and attached, as shown in FIG. 12B.

When this touch pad part 50 is pressed down with a hand touching the upper surface of the upper part 52, input is accepted by the push button switch 113 (see FIG. 2), and the side windows can be lowered only while the touch pad part 50 is being pressed.

Also, when the hand touching the touch pad part 50 is moved from the left side (the base side) to the right side (the tip side) of the upper part 52 as indicated by arrow A, the side windows can be opened until they are completely lowered, in auto mode.

Also, when the hand touching the touch pad part 50 is moved upward from the bottom side of the upper step part 52 to the side surface as indicated by arrow B, the side windows can be raised (closed) only while the hand is touching the touch pad part 50).

Also, when the upper surface of the upper part 52 is touched with a hand and pressed down so as to click twice in succession in one second, input is accepted at the push button switch 113 (see FIG. 2), and the side windows can be fully opened in auto mode.

FIGS. 13A, 13B, and 13C show an operating part 110M3 according to a modification of the embodiment. The operating part 110M3 has areas 111A to 111E, similar to those of the operating part 110 (see FIG. 3A), in plan view. FIG. 13B shows an A-A cross-section of FIG. 13A, and FIG. 13C shows a B-B cross-section of FIG. 13A. The operating part 110M3 has areas 111A to 111E, similar to the touch pad 111 shown in FIG. 3B. As shown in FIG. 13B, a convex part 111G is provided in the center of the surface of the area 111E, and, as shown in FIG. 13C, four concave parts 111H are provided between the convex part 111G and the four corners of the area 111E. By providing the convex part 111G and the concave parts 111H, it becomes possible to determine the arrangement of each area by touch, so that the accuracy of input and the safety of driving when the user performs input operations can be further improved.

FIGS. 14A and 14B show examples of images on the HUD 140B. FIG. 14A shows representational images representing the operating part 110M3 (see FIG. 13A) in the air-conditioning input mode. Representational images 111Aa to 111Ea, 111Ga, and 111Ha of the convex part 111G and the convex parts 111H are displayed. Inside the representational image 111Ga, a representational image 111Ia of a mark of a dial for air volume adjustment is superimposed and displayed. When the user operates the operating part 110M3 (see FIG. 13A) so as to rotate the dial of the representational image Ia, the four concave parts 111H around the convex part 111G are touched, thus giving a three-dimensional touch.

In FIG. 14B, in the air-conditioning input mode, a representational image 111Ja of an image for selecting the mode for setting the wind direction and the defroster is displayed inside the upper right representational image 111Ha. When the hand H moves on the operating part 110 to bring the representational image Ha of the hand H closer to the representational image 111Ja while viewing the display of the HUD 140B shown in FIG. 14B, the hand H touches the concave parts 111H, so that the position of the representational image 111Ja can be identified according to the position of the concave parts 111H.

Figure 15:
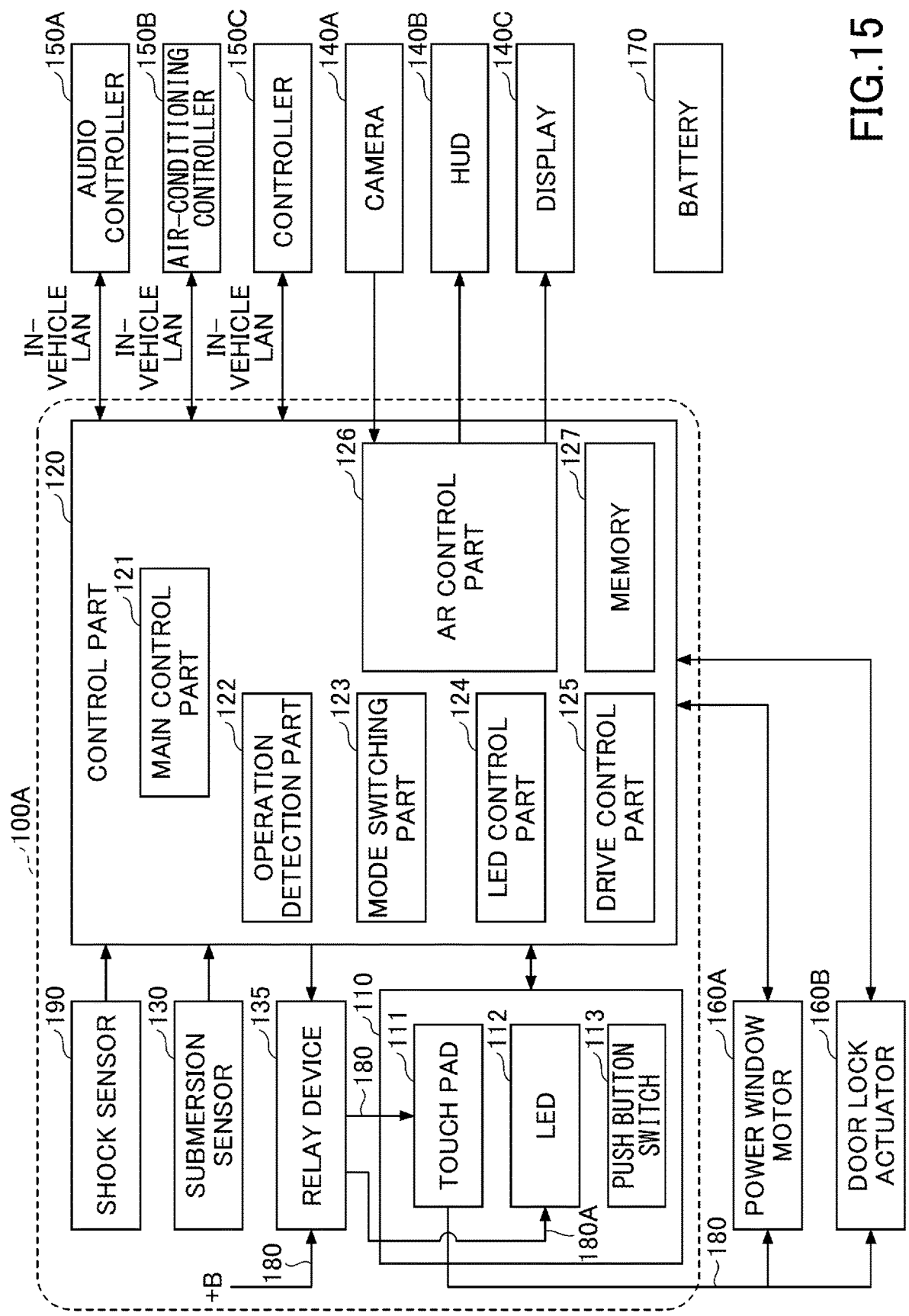
FIG. 15 shows an input device 100A according to a modification of the embodiment.

FIG. 15 shows an input device 100A according to a modification of the embodiment. The input device 100A has a structure in which a shock sensor 190 is added to the input device 100A shown in FIG. 2. The shock sensor 190 is a sensor that detects when the vehicle 10 collides with an object or the like, based on the acceleration or the like generated in the vehicle 10. Upon detecting a collision, the shock sensor 190 generates an emergency detection signal and outputs it to the control part 120 in the same way as when the submersion sensor 130 detects the submersion of the vehicle 10 in water.

The input device 100A operates by pertaining processes in accordance with the flows shown in FIG. 8, FIG. 9, and FIG. 10. Among these, when the submersion sensor 130 detects the submersion of the vehicle 10 in water, the flow shifts from step S0 shown in FIG. 8 to the process shown in FIG. 9, and the process of steps S11 to S15 is executed.

When the shock sensor 190 detects a collision, the input device 100A forcibly switches the input mode of the operating part 110 to the first input mode in the same way as when the submersion sensor 130 detects the submersion of the vehicle 10 in water. When the shock sensor 190 does not detect a collision and the submersion sensor 130 does not detect the submersion of the vehicle 10 in water, the input device 100A is set to the input mode selected by an input operation made to the operating part 110 (that is, set to one of the first input mode and the second input mode).

Also, when the shock sensor 190 detects a collision of the vehicle, the shock sensor 190 generates an emergency detection signal and sends it to the control part 120. The control part 120 determines whether or not the emergency detection signal has been received (step S0), as in the case of the submersion of the vehicle 10 in water shown in FIG. 8. When the control part 120 determines that the emergency detection signal (S0: YES) has been received, the control part 120 executes the emergency process shown in FIG. 9. The process executed by the input device 100A when a collision is detected by the shock sensor 190 is the same as the process of steps S11 to S15 shown in FIG. 9. That is, in order to secure an exit from the vehicle 10, only the LEDs 112 corresponding to the lighting parts 111Bb and 111Cb are turned on, and the representational images 111Baa and 111Caa are displayed with emphasis. By this means, it is possible to provide an input device 100A that can indicate the positions for operating the windows or door locks of the vehicle 10 even when the shock sensor 190 detects a collision.

Figure 16:
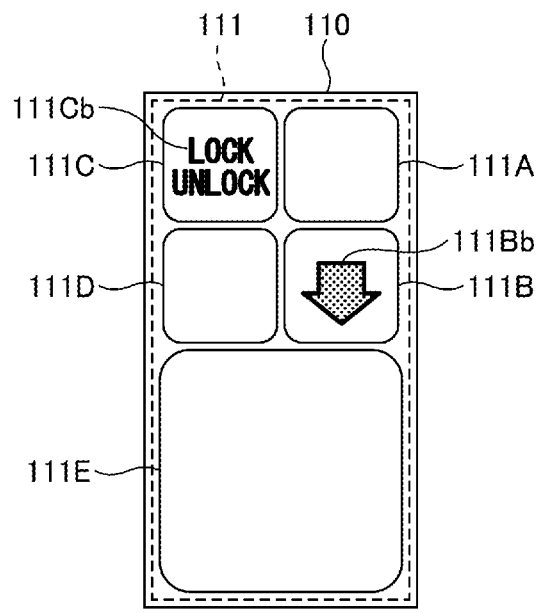
FIG. 16 shows the state of the operating part 110 when the vehicle 10 has a collision.

FIG. 16 shows the state of the operating part 110 when the vehicle 10 has a collision. Referring to FIG. 16, when the control part 120 turns on the LEDs 112, a lighting part 111Bb having a symbol shape of a downward arrow for opening the side windows and a lighting part 111Cb for switching between locking ("Lock") and unlocking ("Unlock") the doors are lit by transmitted light in the areas 111B and 111C of the touch pad 111. The other lighting parts are turned off. Therefore, when the vehicle 10 has a collision, the part that functions as a switch for opening the side windows and the part that functions as a switch for unlocking the doors can be displayed with emphasis, so that the user is able to visually identify and operate these parts, open the side windows and/or unlock the doors, and escape from the vehicle.

Also, at this time, the HUD 140B shows a display in which the representational images 111Baa and 111Caa are emphasized, as shown in FIG. 4B. Note that, when a collision occurs, the lighting part 111Cb for unlocking the doors may be lit and the representational image 111Caa may be emphasized, in which case it may not be necessary to light the lighting part 111Bb for opening the side windows or emphasize the representational image 111Baa, but if the side window can be opened, an exit can be secured even when it is difficult to open the doors.

Note that, although a structure has been described with this embodiment in which the HUD 140B is mainly used to provide image information to the user, the display 140C may be mainly used to provide image information instead. Also, it is possible to employ a structure in which image information is provided to the user by using both the HUD 140B and the display 140C.

Therefore, it is possible to provide an input device 100 that can indicate the positions for operating the door locks of the vehicle 10 when the vehicle 10 submerges in water or when the vehicle 10 has a collision. Also, when both submersion and a collision occur, the submersion sensor 130 operates to perform the same process as when the vehicle submerges in water. Also, a sensor that can detect emergencies other than submersion and collision may be further provided to enable handling of emergencies other than submersion and collision.

Although an input device according to an example embodiment of the present invention has been described above, the present invention is not limited to the specifically disclosed embodiment, and various modifications and changes may be made without departing from the scope of the claims.

What is claimed is:

1. An input device comprising:
   an operating part having lighting parts and configured to accept input operations in one of:
      a first input mode, in which an operation for operating, among devices provided in a vehicle, at least a first device including a window or a door lock of the vehicle can be made; and
      a second input mode, in which an operation for operating a second device other than the first device among the devices provided in the vehicle can be made;
   an emergency detection part configured to detect an emergency of the vehicle; and
   a control part configured to set an input mode of the operating part to one of the first input mode and the second input mode, and set a lighting state of the lighting parts to one of:
      a first lighting state, in which lighting of the lighting parts is emphasized; and
      a second lighting state, in which the lighting of the lighting parts is not emphasized,
   wherein, in response to the emergency detection part detecting the emergency of the vehicle, the control part sets the operating part to the first input mode, and sets at least one of the lighting parts to the first lighting state,
   wherein the operating part has a plurality of touch switches or a touch pad, and wherein, in the first lighting state, among the lighting parts, lighting of the at least one lighting part, arranged at a position for operating the window or the door lock of the vehicle in plan view, is emphasized, the position of the at least one lighting part overlapping at least one touch switch or a part of the touch pad.

2. The input device according to claim 1, wherein, in response to the emergency detection part not detecting the emergency of the vehicle, the control part sets the operating part to the first input mode or the second input mode, and sets the at least one of the lighting parts to the second lighting state, based on a mode selection operation made to the operating part.

3. The input device according to claim 1, wherein, in the first lighting state:
   among the lighting parts, lighting of lighting parts other than the at least one lighting part arranged at the position for operating the window or the door lock of the vehicle in plan view is made dimmer or turned off; or
   among the lighting parts, the lighting of the lighting parts other than the at least one lighting part arranged at the position for operating the window or the door lock of the vehicle in plan view is unchanged, and the lighting of the at least one lighting part arranged at the position for operating the window or the door lock of the vehicle in plan view is made brighter.

4. The input device according to claim 1, wherein, in the first lighting state, among the lighting parts, the at least one lighting part arranged at the position for operating the window or the door lock of the vehicle in plan view is lit in a color that is different from a color in the second lighting state.

5. The input device according to claim 1, wherein, in the first lighting state, among the lighting parts, the at least one lighting part arranged at the position for operating the window or the door lock of the vehicle in plan view is lit with a higher luminance than in the second lighting state.

6. The input device according to claim 1, wherein, in the first lighting state, among the lighting parts, the at least one lighting part arranged at the position for operating the window or the door lock of the vehicle in plan view flashes intermittently.

7. The input device according to claim 1, further comprising a display controlled by the control part and configured to display an interface that represents the operating part,
   wherein, in response to the emergency detection part detecting the emergency of the vehicle, the control part displays the interface representing the operating part on the display with emphasis.

8. The input device according to claim 7, wherein, upon display of a part of the interface corresponding to the at least one touch switch or the part of the touch pad for operating the window or the door lock of the vehicle with emphasis, the part flashes intermittently.

9. The input device according to claim 7, wherein, upon display of a part of the interface corresponding to the at least one touch switch or the part of the touch pad for operating the window or the door lock of the vehicle with emphasis, a size of the part of the interface varies.

10. The input device according to claim 1, wherein the emergency of the vehicle is submerging of the vehicle in water.

11. The input device according to claim 1, wherein the emergency of the vehicle is a collision of the vehicle.

12. The input device according to claim 1, further comprising:
   a power supply line connecting a power source of the vehicle and a driving part of the window or the door lock of the vehicle through the operating part; and
   a switching circuit inserted in series with the power supply line, and configured to switch to a conducting state when the vehicle submerges in water.

13. The input device according to claim 1, wherein, in response to the emergency detection part detecting the emergency of the vehicle, the control part forcibly switches the operating part to the first input mode.

14. An input device comprising:
   an operating part having lighting parts and configured to accept input operations in one of:
      a first input mode, in which an operation for operating, among devices provided in a vehicle, at least a first device including a window or a door lock of the vehicle can be made; and
      a second input mode, in which an operation for operating a second device other than the first device among the devices provided in the vehicle can be made; and
   a control part configured to set an input mode of the operating part to one of the first input mode and the second input mode, and set a lighting state of the lighting parts to one of:
      a first lighting state, in which lighting of the lighting parts is emphasized; and
      a second lighting state, in which the lighting of the lighting parts is not emphasized,
   wherein, upon receipt of an emergency detection signal issued by an emergency detection part, the control part sets the operating part to the first input mode, and sets at least one of the lighting parts to the first lighting state, wherein the operating part has a plurality of touch switches or a touch pad, and wherein, in the first lighting state, among the lighting parts, lighting of the at least one lighting part, arranged at a position for operating the window or the door lock of the vehicle in plan view, is emphasized, the position of the at least one lighting part overlapping at least one touch switch or a part of the touch pad.

\* \* \* \* \*